(12) United States Patent
Watfa

(10) Patent No.: US 12,414,079 B2
(45) Date of Patent: Sep. 9, 2025

(54) METHOD AND APPARATUS FOR USER CONFIDENTIALITY IN WIRELESS COMMUNICATION SYSTEM

(71) Applicant: Samsung Electronics Co., Ltd., Suwon-si (KR)

(72) Inventor: Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 422 days.

(21) Appl. No.: 17/799,479

(22) PCT Filed: Feb. 10, 2021

(86) PCT No.: PCT/KR2021/001831
§ 371 (c)(1),
(2) Date: Aug. 12, 2022

(87) PCT Pub. No.: WO2021/162477
PCT Pub. Date: Aug. 19, 2021

(65) Prior Publication Data
US 2023/0076078 A1    Mar. 9, 2023

(30) Foreign Application Priority Data

Feb. 14, 2020 (GB) .................................... 2002092
Oct. 14, 2020 (GB) .................................... 2016323

(51) Int. Cl.
*H04W 68/02* (2009.01)
*H04W 76/19* (2018.01)

(52) U.S. Cl.
CPC .......... *H04W 68/02* (2013.01); *H04W 76/19* (2018.02)

(58) Field of Classification Search
CPC ............................. H04W 68/02; H04W 76/19
See application file for complete search history.

(56) References Cited

U.S. PATENT DOCUMENTS

| | | | |
|---|---|---|---|
| 12,022,560 B2 * | 6/2024 | Watfa | ................ H04W 52/0206 |
| 2017/0311278 A1 * | 10/2017 | Adjakple | ............... H04W 60/04 |
| 2017/0311290 A1 * | 10/2017 | Adjakple | ............... H04W 76/18 |
| 2017/0318452 A1 | 11/2017 | Hahn et al. | |
| 2019/0029066 A1 | 1/2019 | Xu et al. | |

(Continued)

FOREIGN PATENT DOCUMENTS

| | | |
|---|---|---|
| EP | 3448089 A1 | 2/2019 |
| WO | 2015/172088 A1 | 11/2015 |

(Continued)

OTHER PUBLICATIONS

British Search Report dated Dec. 8, 2022, issued in British Patent Application No. GB2216998.1.

(Continued)

*Primary Examiner* — Michael J Moore, Jr.
(74) *Attorney, Agent, or Firm* — Jefferson IP Law, LLP

(57) ABSTRACT

A method performed by a first network entity in a network comprising a user equipment (UE) and the first network entity s provided. The method may include: transmitting, to the UE allocated with a current temporary identity, a paging message; receiving a request associated with resuming a connection for the UE; and allocating a new temporary identity for the UE based on the received request.

13 Claims, 12 Drawing Sheets

(56) References Cited

U.S. PATENT DOCUMENTS

| | | | | |
|---|---|---|---|---|
| 2020/0314955 | A1* | 10/2020 | Velev | H04W 76/11 |
| 2021/0105837 | A1* | 4/2021 | Lee | H04W 8/26 |
| 2022/0078872 | A1* | 3/2022 | Shrestha | H04W 76/30 |
| 2022/0264305 | A1* | 8/2022 | Hu | H04W 76/19 |
| 2023/0076078 | A1* | 3/2023 | Watfa | H04W 76/19 |

FOREIGN PATENT DOCUMENTS

| | | |
|---|---|---|
| WO | 2017/079074 A1 | 5/2017 |
| WO | 2020/078417 A1 | 4/2020 |
| WO | 2021/040423 A1 | 3/2021 |
| WO | 2021/067074 A1 | 4/2021 |

OTHER PUBLICATIONS

"3GPP; TSA CT; Non-Access-Stratum (NAS) protocol for 5G System (5GS); Stage 3", 3GPP TS 24.501 V16.3.0, Dec. 20, 2019.
Huawei et al., "Discussion on removal of mandating 5G-GUTI allocation after network triggered service request", C1-190270, 3GPP TSG CT WG1 Meeting #114, Bratislava, Slovakia, Jan. 14, 2019.
Mediatek Inc., "Providing the UE with new 5G-GUTI at Service Accept message", C1-196518, 3GPP TSG-CT1 Meeting #120, Portoroz, Slovenia, Sep. 30, 2019.
ZTE, "5G-GUTI provided to lower layer", C1-191061, 3GPP TSG CT WG1 Meeting #115, Montreal, Canada, Mar. 1, 2019.
Qualcomm Incorporated, "MT-EDT introduction", SA WG2 Meeting #136-AH, Incheon, South Korea, Jan. 13-17, 2020, S2-2000264.
Huawei, HiSilicon, "Discussion on implementation of MT-EDT for 5GS in stage 3", 3GPP TSG CT WG1 Meeting #121, Reno (NV), USA, Nov. 11-15, 2019, C1-198227.
Qualcomm Incorporated, "5G-GUTI allocation in MT-EDT procedure", SA WG2 Meeting #136, Nov. 18-22, 2019, Reno, USA, S2-1911720.
3GPP TR 23.711 V0.3.0 (Jan. 2016), 3rd Generation Partnership Project; Technical Specification Group Services and System Aspects; Enhancements of Dedicated Core Networks selection mechanism (Release 14), TR23.711.
Qualcomm Incorporated, "Clarifications for GUTI re-allocation", 3GPP TSG-SA WG2 Meeting #141e, Oct. 12-Oct. 23, 2020, Online, S2-2007682.
British Search Report and Examination Report dated Jul. 27, 2020, issued in GB Patent Application No. 2002092.1.
British Search Result dated Jul. 14, 2021, issued in GB Patent Application No. 2101860.1.
British Search Report and Examination Report dated Jul. 19, 2021, issued in GB Patent Application No. 2101860.1.
British Examination Report dated May 12, 2022, issued in GB Patent Application No. 2101860.1.
British Search Report and Examination Report dated Mar. 22, 2021, issued in GB Patent Application No. 2016323.4.
Korean Office Action dated Jul. 11, 2025, issued in Korean Patent Application No. 10-2022-7028132.

* cited by examiner

METHOD AND APPARATUS FOR USER CONFIDENTIALITY IN WIRELESS COMMUNICATION SYSTEM

TECHNICAL FIELD

Certain examples of present disclosure provide methods, apparatus and systems for improving user confidentiality in a network. For example, certain examples of the present disclosure provide enhanced user confidentiality in 3GPP 5GS.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Solution to Problem

The disclosure is related to a security associated with paging of a user equipment (UE) and allocating a new temporary identity to the paged UE.

MODE FOR THE INVENTION

Figure 1:
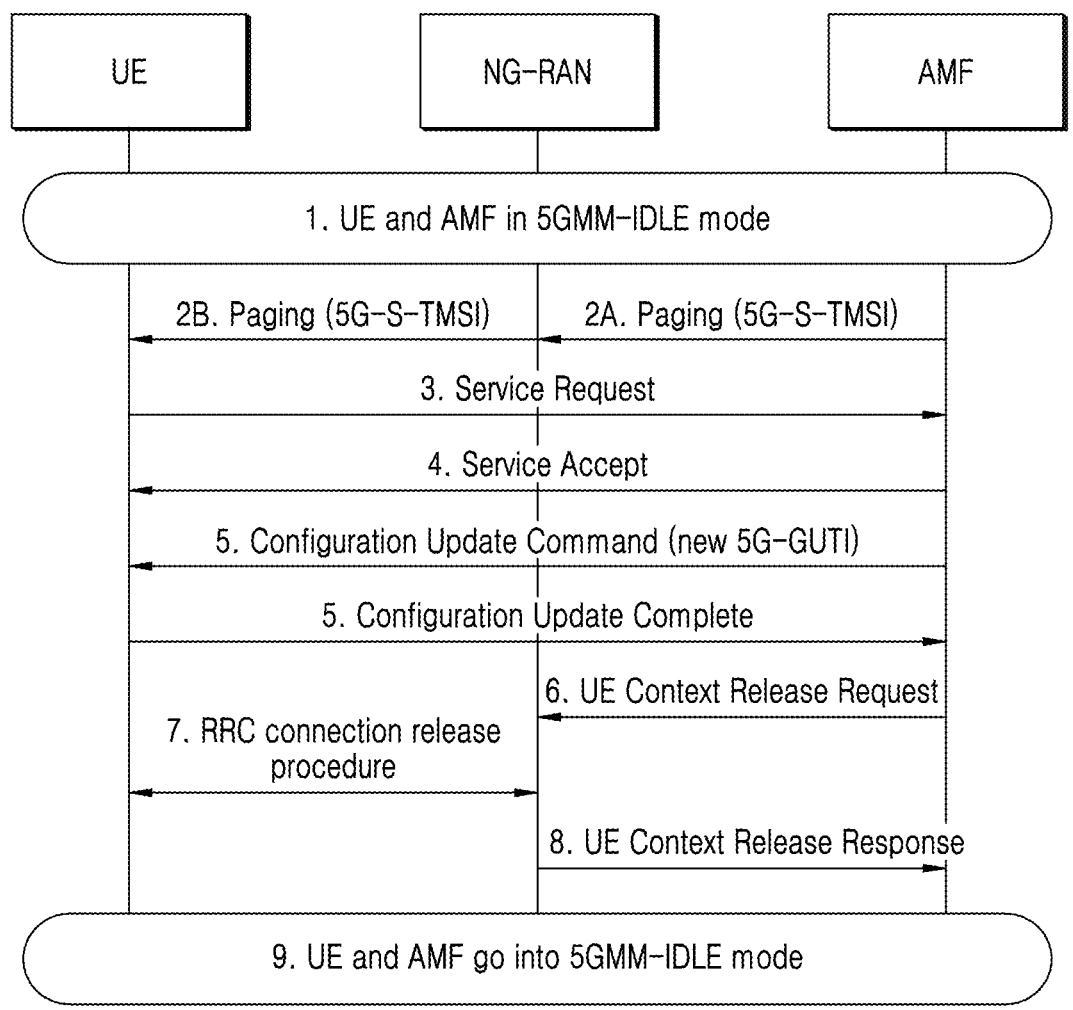
FIG. 1 illustrates the current procedure for 5G GUTI reallocation after a paging and service request procedure, but before release of the NAS Signalling Connection.

Herein, the following documents are referenced:
[1] 3GPP TS 23.003 V16.3.0
[2] 3GPP TS 33.501
[3] 3GPP TS 24.501 V16.3.0
[4] 3GPP TS 23.501 V16.3.0
[5] 3GPP TS 23.502 V16.3.0
[6] 3GPP TS 36.300 V16.0.0
[7] 3GPP TS 38.413 V16.0.0
[8] 3GPP TS 36.331 V15.8.0

Various acronyms and abbreviations used herein are defined at the end of this description.

The above documents disclose various operations and procedures, including (i) allocation of a 5G-GUTI, (ii) User plane CIoT 5GS optimization, and (iii) NAS 5GMM-CONNECTED mode with RRC inactive indication. A new 5G-GUTI may be allocated to improve user confidentiality. However, according to the existing standard, a new 5G-GUTI may not be allocated in some circumstances, jeopardising user confidentiality.

Accordingly, what is desired is a technique in which a new GUTI may be allocated in various circumstances to thereby improve user confidentiality.

The above information is presented as background information only to assist with an understanding of the present disclosure. No determination has been made, and no assertion is made, as to whether any of the above might be applicable as prior art with regard to the present invention. It is an aim of certain examples of the present disclosure to address, solve and/or mitigate, at least partly, at least one of the problems and/or disadvantages associated with the related art, for example at least one of the problems and/or disadvantages described herein. It is an aim of certain examples of the present disclosure to provide at least one advantage over the related art, for example at least one of the advantages described herein.

The present invention is defined in the independent claims. Advantageous features are defined in the dependent claims.

Other aspects, advantages, and salient features will become apparent to those skilled in the art from the following detailed description, taken in conjunction with the annexed drawings, which disclose examples of the present disclosure.

The following description of examples of the present disclosure, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the examples described herein can be made without departing from the scope of the invention.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present invention.

The terms and words used herein are not limited to the bibliographical or standard meanings, but, are merely used to enable a clear and consistent understanding of the invention.

Throughout the description and claims of this specification, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/ or groups thereof described or disclosed in conjunction with a particular aspect, embodiment, example or claim of the present invention are to be understood to be applicable to any other aspect, embodiment, example or claim described herein unless incompatible therewith.

Certain examples of the present disclosure provide methods, apparatus and systems for improving user confidentiality in a network. For example, certain examples of the present disclosure provide enhanced user confidentiality in 3GPP 5GS. However, the skilled person will appreciate that the present invention is not limited to these examples, and may be applied in any suitable system or standard, for example one or more existing and/or future generation wireless communication systems or standards.

The following examples are applicable to, and use terminology associated with, 3GPP 5G. However, the skilled person will appreciate that the techniques disclosed herein are not limited to 3GPP 5G. For example, the functionality of the various network entities and other features disclosed herein may be applied to corresponding or equivalent entities or features in other communication systems or standards. Corresponding or equivalent entities or features may be regarded as entities or features that perform the same or similar role, function or purpose within the network. For example, the functionality of the AMF in the examples below may be applied to any other suitable type of entity performing mobility management functions, and the functionality of the NG-RAN in the examples below may be applied to any other suitable type of entity performing RAN functions. The skilled person will also appreciate that the transmission of information between network entities is not limited to the specific form, type or order of messages described in relation to the examples disclosed herein.

A particular network entity may be implemented as a network element on a dedicated hardware, as a software instance running on a dedicated hardware, and/or as a virtualised function instantiated on an appropriate platform, e.g. on a cloud infrastructure.

The skilled person will appreciate that the present invention is not limited to the specific examples disclosed herein. For example:

- The techniques disclosed herein are not limited to 3GPP 5G.
- One or more entities in the examples disclosed herein may be replaced with one or more alternative entities performing equivalent or corresponding functions, processes or operations.
- One or more of the messages in the examples disclosed herein may be replaced with one or more alternative messages, signals or other type of information carriers that communicate equivalent or corresponding information.
- One or more further elements or entities may be added to the examples disclosed herein.
- One or more non-essential elements or entities may be omitted in certain examples.
- The functions, processes or operations of a particular entity in one example may be divided between two or more separate entities in an alternative example.
- The functions, processes or operations of two or more separate entities in one example may be performed by a single entity in an alternative example.
- Information carried by a particular message in one example may be carried by two or more separate messages in an alternative example.

Information carried by two or more separate messages in one example may be carried by a single message in an alternative example.

The order in which operations are performed and/or the order in which messages are transmitted may be modified, if possible, in alternative examples.

Certain examples of the present disclosure may be provided in the form of an apparatus/device/network entity configured to perform one or more defined network functions and/or a method therefor. Certain examples of the present disclosure may be provided in the form of a system comprising one or more such apparatuses/devices/network entities, and/or a method therefor.

In the following examples, a network may include a UE, an NG-RAN entity and an AMF entity.

Enhanced Security in 5GS & Allocation of a New 5G Globally Unique Temporary UE Identity (5G-GUTI)

5GS introduced several enhancement to security in comparison to EPS. For example, the concept of initial NAS message protection was introduced in 5GS whereas it was not supported in EPS. Another security enhancement that was introduced in 5GS is regarding the allocation of a 5G-GUTI to the UE during certain procedures based on security requirements that were lacking in EPS.

To understand the benefits of these requirements, it is better to first understand what a 5G-GUTI is used for. When the UE first registers with 5GS, the UE identifies itself with a subscriber identifier that is usually permanent per subscription. However, when the UE registers with 5GS, the network allocates a temporary identifier known as the 5G-GUTI after which the UE uses this identity when sending signalling to the network.

In [1], the following description is provided regarding the 5G-GUTI:

The purpose of the 5G-GUTI is to provide an unambiguous identification of the UE that does not reveal the UE or the user's permanent identity in the 5G System (5GS). It also allows the identification of the Access and Mobility Management Function (AMF) and network. It can be used by the network and the UE to establish the UE's identity during signalling between them in the 5GS. See 3GPP TS 23.501 [119].

The 5G-GUTI has two main components:
  one that identifies the AMF(s) which allocated the 5G-GUTI; and
  one that uniquely identifies the UE within the AMF(s) that allocated the 5G-GUTI.

In 4G, the corresponding temporary identity was simply referred to as GUTI. Moreover, in 4G, when the network decides to allocate a new GUTI was up to the network implementation or decision. On the other hand, in Rel-15 of 5GS there was a requirement to always allocate a new 5G-GUTI as described in [2]:

A new 5G-GUTI shall be sent to a UE only after a successful activation of NAS security. The 5G-GUTI is defined in TS 23.003 [19].

Upon receiving Registration Request message of type "initial registration" or "mobility registration update" from a UE, the AMF shall send a new 5G-GUTI to the UE in the registration procedure.

Upon receiving Registration Request message of type "periodic registration update" from a UE, the AMF should send a new 5G-GUTI to the UE in the registration procedure.

Upon receiving Service Request message sent by the UE in response to a Paging message, the AMF shall send a new 5G-GUTI to the UE. This new 5G-GUTI shall be sent before the current NAS signalling connection is released.

NOTE 1: It is left to implementation to re-assign 5G-GUTI more frequently than in cases mentioned above, for example after a Service Request message from the UE not triggered by the network.

NOTE 2: It is left to implementation to generate 5G-GUTI containing 5G-TMSI that uniquely identifies the UE within the AMF.

The relevant aspect for this document is related to the requirement for 5G-GUTI re-allocation following a service request procedure in response to network paging.

From the above, and given that the UE sends a Service Request message (or Control Plane Service Request message) in response to a paging message, except in some cases that will be identified later, it is required to always allocate a new 5G-GUTI to the UE.

FIG. 1 shows the current procedure for 5G GUTI reallocation after a paging and service request procedure (for which the UE is shown, as an example, to send a Service Request message), but before release of the NAS Signalling Connection.

A new 5G-GUTI can be allocated to the UE either in the Registration Accept message (i.e. during a registration procedure), or in the Configuration Update Command message which can be initiated at any time when the UE is in 5GMM-CONNECTED mode such as after a service request procedure. In [3], with respect to the allocation of a new 5G-GUTI using the Configuration Update Command message (or the generic UE configuration update procedure), it is specified that:

This procedure shall be initiated by the network to assign a new 5G-GUTI to the UE after a successful service request procedure invoked as a response to a paging request from the network and before the release of the N1 NAS signalling connection. If the service request procedure was triggered due to 5GSM downlink signalling pending, the procedure for assigning a new 5G-GUTI can be initiated by the network after the transport of the 5GSM downlink signalling.

According to the above, when the UE is paged, the UE will initiate a service request procedure by sending the Service Request or Control Plane Service Request message. After the completion of the procedure, and before the release of the NAS connection, the network shall allocate a new 5G-GUTI to the UE.

The reason behind the requirement to allocate a new 5G-GUTI as described above is to ensure user confidentiality is not jeopardized. For example, a fake RAN node can page a UE with its 5G-S-TMSI and in response to paging, the UE would send e.g. a Service Request message. In doing so, the fake RAN node can then identify the UE's location based on where the response to paging is sent. If the UE's 5G-GUTI is not changed, then the fake RAN node can page the UE again with the 5G-S-TMSI and then locate the UE again based on the UE's response. Hence the UE's location can be identified and the user can be tracked. Note that the 5G-S-TMSI is a component of the 5G-GUTI and therefore maintaining the same 5G-GUTI for the UE, hence the same 5G-S-TMSI, can enable a fake RAN entity to track a user by paging it as described above.

However, with the requirement to always allocate a new 5G-GUTI after paging, the fake RAN node will not be able to correlate between the old 5G-S-TMSI (from the old 5G-GUTI) and the new 5G-S-TMSI (from the new 5G-GUTI that gets allocated after paging) for the purpose of tracking the user. Hence, this requirement ensures a stronger user confidentiality.

User Plane CIoT 5GS Optimization

Figure 2:
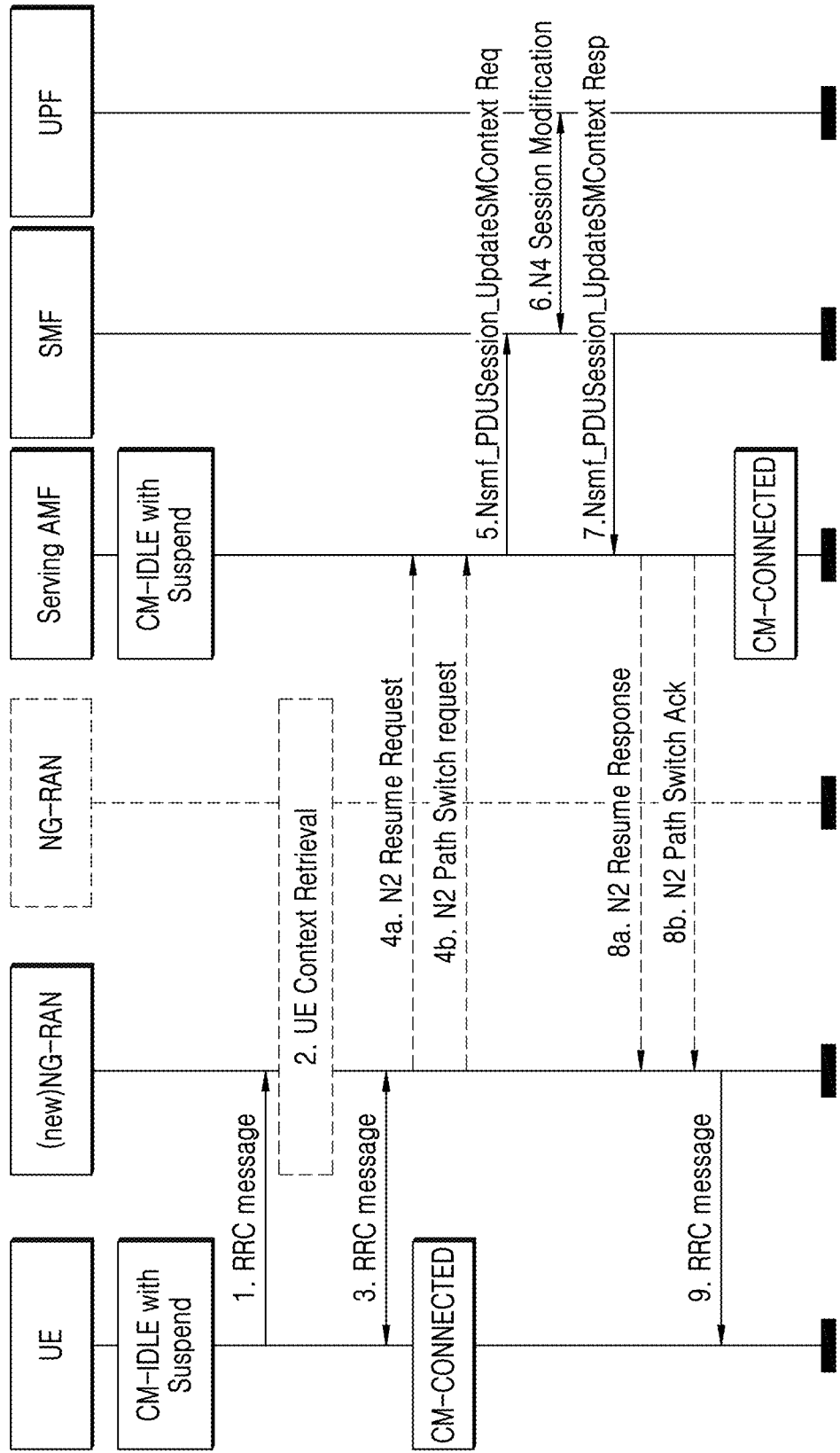
FIG. 2 illustrates Connection Resume in CM-IDLE with Suspend (from [5])

One of the features that was introduced as part of 5G Cellular Internet of Things (CIoT) is user plane CIoT 5GS optimization. It enables transfer of user plane data from 5GMM-IDLE without the need for using the service request procedure to establish Access Stratum (AS) context in NG-RAN and UE. The feature defines a new 5GMM-IDLE mode with suspend indication which if entered by the UE would mean that the UE's context is maintained in the RAN although the UE does not have an RRC connection. To go back to 5GMM-CONNECTED mode, the UE should resume its connection and provide a Resume ID which the NG-RAN will use to establish the UE's AS layer context. The high level description of the user plane CIoT 5GS optimization can be found in [4], whereas in [5] the details of the resume procedure can be found and is shown in FIG. 2 with steps 1-9 described below:

1. UE to NG-RAN: RRC message (Resume ID).

The UE initiates the transition from CM-IDLE and RRC IDLE state with Suspend to CM-CONNECTED and RRC Connected state, see TS 36.300 [46]. The UE provides its Resume ID needed by the NG-RAN to access the UE's stored Context.

2. [Conditional] NG-RAN performs UE Context Retrieval.

UE Context Retrieval may be performed when the UE Context associated with the UE attempting to resume its connection is not locally available at the accessed NG-RAN. The UE Context Retrieval procedure via radio access network is specified in TS 38.300 [9].

3. NG-RAN and UE continues the resume procedure and access stratum configuration synchronization is performed between the UE and the network. UE enters CM-CONNECTED and RRC_CONNECTED.

4. NG-RAN to AMF:

a) If the NG-RAN is the same as the NG-RAN when UE is suspended, the NG-RAN sends N2 Resume Request to AMF including Resume cause, and N2 SM information which indicates the PDU sessions successfully resumed, and PDU sessions failed or partially failed to resume the user plane resource.

b) If the NG-RAN is different from the NG-RAN when UE is suspended, and the new NG-RAN is able to retrieve the UE Context from the old NG-RAN, the new NG-RAN node initiates N2 Path Switch Request towards AMF, i.e. Steps 1b of clause 4.9.1.2.2.

If the RRC connection is resumed and the UE is accessing via the NB-IoT RAT with the RRC resume cause set to "MO exception data", the AMF updates all (H-)SMFs which have PDU Sessions using Small Data Rate Control with the MO Exception Data Counter. The AMF maintains the MO Exception Data Counter for Small Sata Rate Control purposes as described in clause 5.31.14.3 of TS 23.501 [2]. The (H-)SMF, in an N4 Session Modification Request, updates all UPFs and NEFs which have PDU Session(s) using Small Data Rate Control as to whether an RRC Connection was established for "MO Exception data" for Small Data Rate Control purposes. Each UPF should be updated for the first new RRC Connection which is triggered for "MO Exception data" and the first new RRC Connection afterwards without "MO Exception data".

5. AMF to SMF: For each of the PDU Sessions indicated in step 4, the AMF invokes Nsmf_PDUSession_UpdateSMContext Request (PDU Session ID, Cause, Operation type, User Location Information, Age of Location Information, N2 SM Information). The Operation Type is set to "UP Resume" to indicate resume of user plane resources for the PDU Session.

For PDU Session(s) to be switched to the new NG-RAN, upon receipt of the Nsmf_PDUSession_UpdateSMContext request, the SMF determines whether the existing UPF can continue to serve the UE. If the existing UPF cannot continue to serve the UE, steps 3 to 7 of clause 4.9.1.2.3 or clause 4.9.1.2.4 are performed depending on whether the existing UPF is a PDU Session Anchor and flow continues in step 7. Otherwise, step 6 is performed if the existing UPF can continue to serve the PDU Session.

6. SMF to UPF: N4 Session Modification Request (AN Tunnel Info to be resumed, Buffering on/off).

The SMF initiates an N4 Session Modification procedure indicating the resume of AN tunnel. Buffering on/off indicates whether the UPF shall buffer incoming DL PDU or not.

If step 4a) is performed, the AN tunnel info is the one maintained by the SMF during Connection Suspend procedure, step 3 of clause 4.8.1.2. If step 4b) is performed, the AN tunnel info is part of the N2 SM information received by SMF in step 5.

The UPF sends N4 Session Modification Response to acknowledge the SMF request.

7. SMF to AMF: The SMF sends Nsmf_PDUSession_UpdateSMContext response to the AMF.

If new CN tunnel information is allocated for the PDU session, i.e. in the case of new AN tunnel is received in step 6, the SMF includes the new CN tunnel information as part of the N2 SM information.

If the resume for PDU session is unsuccessful, the SMF shall include the resume failure as part of the N2 SM information.

8. AMF to NG-RAN: After response for each PDU session in step 7, the AMF sends N2 Resume Response to NG-RAN and indicates success, including N2 SM information for PDU session received in step 7, if at least one PDU session is resumed successfully. If none of the PDU sessions is resumed successfully, AMF indicates failure to NG-RAN.

The AMF sends N2 Path Switch Acknowledge with PDU session resume information, if Path Switch Request is received in step 4.

The AMF may provide Extended Connected Time value to the NG-RAN. If the NG-RAN receives the Extended Connected Time value, the NG-RAN may take this information into account when determining user inactivity.

9. [Conditional] NG-RAN to UE: RRC message.

The NG-RAN may reconfigure the RRC connection based on resume result received from AMF.

Note that although 5G CIoT introduced new CIoT features at the NAS layer, the radio access uses existing RATs such as WB-EUTRA or NB-IoT. As such, the RRC procedures and messages used are the same as those in 4G.

Figure 3:
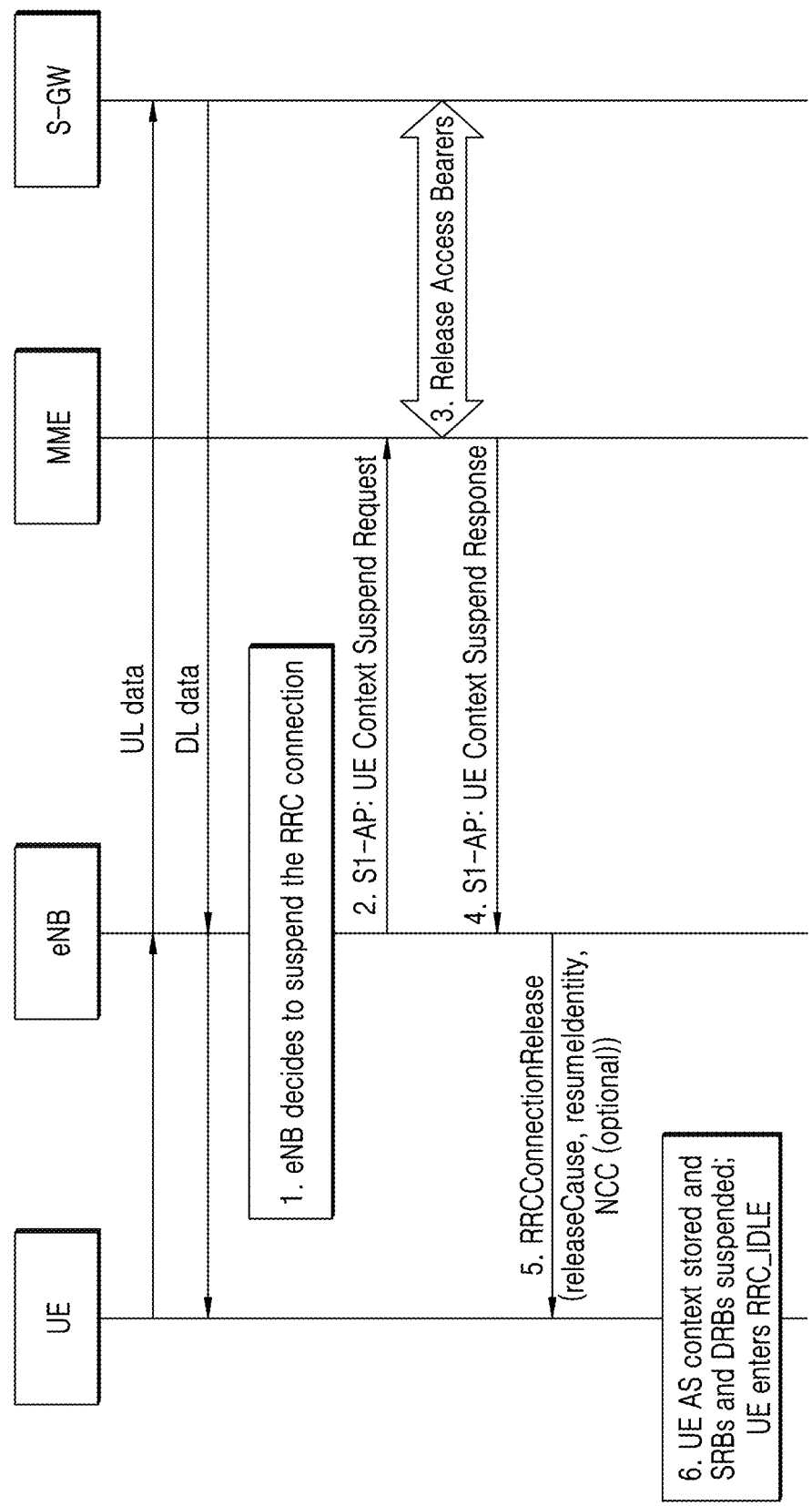
FIG. 3 illustrates RRC Connection Suspend procedure (from [6])

The RAN procedure to suspend a connection for the UE, due to the use of user plane CIoT 5GS optimization, is shown in FIG. 3 from [6] with steps 1-6 described below:

1. Due to some triggers, e.g. the expiry of a UE inactivity timer, the eNB decides to suspend the RRC connection.

2. The eNB initiates the S1-AP UE Context Suspend procedure to inform the MME that the RRC connection is being suspended.

3. The MME requests the S-GW to release all S1-U bearers for the UE.

4. MME Acks step 2.

5. The eNB suspends the RRC connection by sending an RRCConnectionRelease message with the releaseCause set to rrc-Suspend. The message includes the Resume ID which is stored by the UE. Optionally, for EDT, the message also includes the NextHopChainingCount which is stored by the UE.

6. The UE stores the AS context, suspends all SRBs and DRBs, and enters RRC_IDLE.

Figure 4:
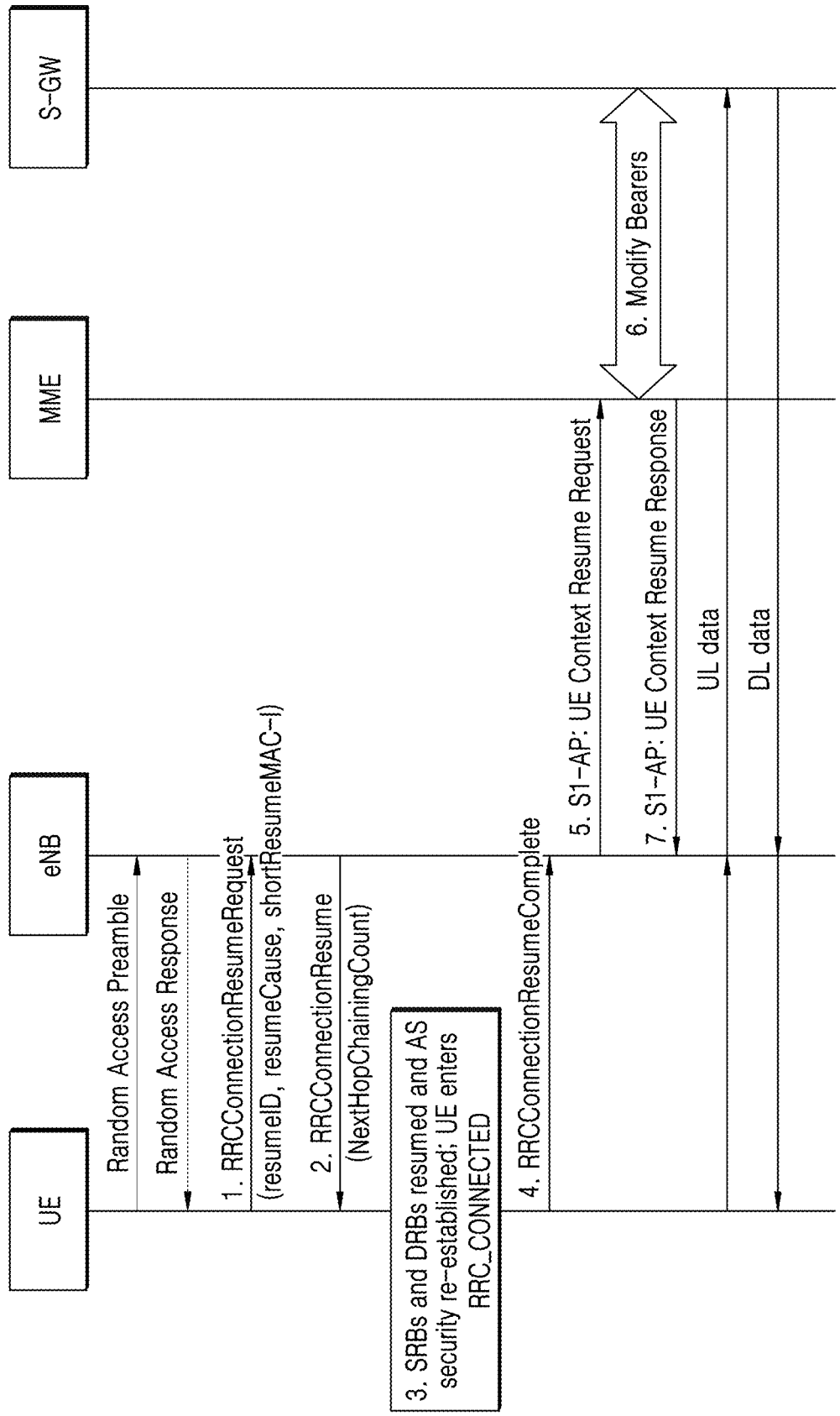
FIG. 4 illustrates RRC Connection Resume procedure (from [6])

The RAN procedure to resume a connection for the UE, due to the use of user plane CIoT 5GS optimization, is shown in FIG. 4 from [6] with steps 1-7 described below:

1. At some later point in time (e.g. when the UE is being paged or when new data arrives in the uplink buffer) the UE resumes the connection by sending an RRCConnectionResumeRequest to the eNB. The UE includes its Resume ID, the establishment cause, and authentication token. The authentication token is calculated in the same way as the short MAC-I used in RRC connection re-establishment and allows the eNB to verify the UE identity.

2. Provided that the Resume ID exists and the authentication token is successfully validated, the eNB responds with an RRCConnectionResume. The message includes the Next Hop Chaining Count (NCC) value which is required in order to re-establish the AS security.

3. The UE resumes all SRBs and DRBs and re-establishes the AS security. The UE is now in RRC_CONNECTED.

4. The UE responds with an RRCConnectionResumeComplete confirming that the RRC connection was resumed successfully, along with an uplink Buffer Status Report, and/or UL data, whenever possible, to the eNB.

5. The eNB initiates the S1-AP Context Resume procedure to notify the MME about the UE state change.

6. The MME requests the S-GW to activate the S1-U bearers for the UE.

7. MME Acks step 5.

As indicated above, although the 5G CIoT features are for 5GS, the feature relies on the re-use of E-UTRA or NB-IoT RAT connected to the 5G core (5GC). Hence, the RRC messages used above would be the same for 5G CIoT however the NAS messages and the messages between the RAN and the AMF would be different. The NAS messages for 5G CIoT are defined in [3] whereas the messages between NG-RAN and the AMF are defined in [7].

It should be noted that when the UE is in 5GMM-IDLE mode with suspend indication, the UE does not always send a Service Request or Control Plane Service Request message even if paged by the network. For example, the following is from the paging procedure that is specified in [3]:

Upon reception of a paging indication, the UE shall stop the timer T3346, if running, and:
a) if control plane CIoT 5GS optimization is not used by the UE, the UE shall initiate:
1) a service request procedure over 3GPP access to respond to the paging as specified in subclauses 5.6.1; or
2) a registration procedure for mobility and periodic registration update over 3GPP access to respond to the paging as specified in subclauses 5.5.1.3.2, and additionally if the UE is in the 5GMM-IDLE mode with suspend indication, resume the suspended N1 NAS signalling connection to the AMF as specified in subclause 5.3.1.5; or
b) if control plane CIoT 5GS optimization is used by the UE, the UE shall:
1) initiate a service request procedure as specified in subclause 5.6.1.2.2 if the UE is in the 5GMM-IDLE mode without suspend indication;
2) initiate a registration procedure for mobility and periodic registration update over 3GPP access as specified in subclauses 5.5.1.3.2; or
3) proceed as specified in subclause 5.3.1.5 if the UE is in the 5GMM-IDLE mode with suspend indication.

From the above, it is evident that the UE should follow the behaviour defined for the 5GMM-IDLE mode with suspend indication after a paging message is received. The UE behaviour in this mode is also specified in [3] as follows:

In the UE, when user plane CIoT 5GS optimization is used:
Upon indication from the lower layers that the RRC connection has been suspended, the UE shall enter 5GMM-IDLE mode with suspend indication, shall not consider the N1 NAS signalling connection released and shall not consider the secure exchange of NAS messages terminated (see subclause 4.4.2.5 and 4.4.5).
Upon trigger of a procedure using an initial NAS message when in 5GMM-IDLE mode with suspend indication, the UE shall:
i) if the initial NAS message is a REGISTRATION REQUEST message with the NG-RAN-RCU bit of the 5GS update type IE set to "NG-RAN radio capability update needed", enter 5GMM-IDLE mode without suspend indication and proceed with the registration procedure; or
ii) otherwise, request the lower layer to resume the RRC connection.
NOTE 1: In NB-N1 mode, in the request to the lower layer the data volume information of the initial NAS message is provided to the lower layers. Interactions between the NAS and the lower layers in order to obtain the data volume information of the initial NAS message (see 3GPP TS 36.321 [25E], 3GPP TS 36.331 [22]) is left to implementations.
Upon indication from the lower layers that the RRC connection has been resumed when in 5GMM-IDLE mode with suspend indication, the UE shall enter 5GMM-CONNECTED mode. If the pending NAS message is:
i) a SERVICE REQUEST message, the service type IE is not set to "emergency services fallback", and the UE did not include the NAS message container IE in the SERVICE REQUEST message; or
ii) a CONTROL PLANE SERVICE REQUEST message, and the UE did not include the CIoT small data container IE or the NAS message container IE in the CONTROL PLANE SERVICE REQUEST message,
the message shall not be sent. Otherwise the UE shall cipher the message as specified in subclause 4.4.5 and send the pending initial NAS message upon entering 5GMM-CONNECTED mode;

From the last bullets above, it is clear that the UE does not send a Service Request message or the Control Plane Service Request message when the listed conditions are met. Hence, although the UE has been paged, the UE resumes the connection and enters 5GMM-CONNECTED mode without sending the Service Request message or the Control Plane Service Request message for these conditions.

The NAS 5GMM-CONNECTED mode with RRC inactive indication

In 5G phase 1, one of the NAS modes that was defined in 3GPP TS 24.501 [1] is 5GMM-CONNECTED mode with RRC inactive indication. The UE is in 5GMM-CONNECTED mode with RRC inactive indication when the UE is in:

a) 5GMM-CONNECTED mode over 3GPP access at the NAS layer; and
b) RRC_INACTIVE state at the AS layer (see 3GPP TS 38.300 [2]).

When the UE has an uplink NAS message to send, the NAS requests the lower layers to resume the connection as specified in [1]:

Upon:
  a trigger of a procedure which requires sending of a NAS message different from a REGISTRATION REQUEST message with the NG-RAN-RCU bit of the 5GS update type IE set to "NG-RAN radio capability update needed"; or
  an uplink user data packet to be sent for a PDU session with suspended user-plane resources;
  the UE in 5GMM-CONNECTED mode with RRC inactive indication over 3GPP access shall request the lower layers to transition to RRC_CONNECTED state (see 3GPP TS 38.300 [27]).

Transitions between 5GMM-CONNECTED mode and 5GMM-CONNECTED mode with RRC inactive indication occurs as follows [1]:
  the UE shall transition from 5GMM-CONNECTED mode over 3GPP access to 5GMM-CONNECTED mode with RRC inactive indication upon receiving an indication from the lower layers that the RRC connection has been suspended
  the UE shall transition from 5GMM-CONNECTED mode with RRC inactive indication to 5GMM-CONNECTED mode over 3GPP access upon receiving an indication from the lower layers that the UE has transitioned to RRC_CONNECTED state.

The UE (NAS) in 5GMM-CONNECTED mode with RRC inactive indication requests the lower layers to resume a connection when there is:
  a trigger of a procedure which requires sending of a NAS message different from a REGISTRATION REQUEST message with the NG-RAN-RCU bit of the 5GS update type IE set to "NG-RAN radio capability update needed", or
  a uplink user data packet to be sent for a PDU session with suspended user-plane resources.

However, it is not always the case that the resumption of a suspended connection (i.e. due to being in RRC inactive state) will be successful. The lower layers (RRC) may not succeed in resuming a connection and hence the UE (NAS) must enter 5GMM-IDLE mode and re-establish the NAS connection from 5GMM-IDLE mode. This may be due to a fallback indication from the lower layers. The cases in which the UE enters 5GMM-IDLE mode following a fallback indication from the lower layers, and the expected NAS behavior are reproduced below from [1]:

If the UE requests the lower layers to transition to RRC_CONNECTED state at initiation of a registration procedure, a service request procedure or a de-registration procedure, upon fallback indication from lower layers, the UE shall:
  enter 5GMM-IDLE mode;
  proceed with the pending procedure; and
  if the pending procedure is a service request or registration request procedure, the UE shall include the Uplink data status IE in the SERVICE REQUEST message, or in the REGISTRATION REQUEST message, indicating the PDU session(s) without active user-plane resources for which the UE has pending user data to be sent, if any, and the PDU session(s) for which user-plane resources were active prior to receiving the fallback indication, if any (see subclauses 5.5.1.3 and 5.6.1 for further details).

If the UE requests the lower layers to transition to RRC_CONNECTED state for other reason than initiation of a registration procedure, or for other reason than a service request procedure, or for other reason than a de-registration procedure, upon fallback indication from lower layers, the UE shall:
  enter 5GMM-IDLE mode;
  initiate service request procedure and include the Uplink data status IE in the SERVICE REQUEST message indicating the PDU session(s) for which user-plane resources were active prior to receiving the fallback indication, if any (see subclause 5.6.1 for further details); and
  upon successful service request procedure completion, proceed with any pending procedure.

If the UE in 5GMM-CONNECTED mode with RRC inactive indication receives a fallback indication from lower layers, and the UE has pending uplink user data for PDU session(s) with user-plane resources already established but no pending NAS procedure, the UE shall:
  enter 5GMM-IDLE mode; and
  initiate the service request procedure and include the Uplink data status IE in the SERVICE REQUEST message indicating the PDU session(s) for which user-plane resources were active prior to receiving the fallback indication (see subclause 5.6.1 for further details).

It should be noted that 5GMM-CONNECTED mode with RRC inactive indication is not applicable to UEs in NB-N1 mode (i.e. NB-IoT UEs) however UEs in WB-N1 mode (i.e. CIoT devices on WB-N1 mode) support 5GMM-CONNECTED mode with RRC inactive indication and hence all the requirements of this mode apply in WB-N1 mode.

The decision to put the UE in RRC inactive state is taken by the NG-RAN node. The AMF provides core network assistance information that is used by the NG-RAN to determine whether the RRC inactive state can be used for the UE as described in [5] and [7]. For example, in [5], it is stated:

4.8.1.1 Connection Inactive Procedure

This procedure may be initiated by the serving NG-RAN node when the UE is in CM-CONNECTED with RRC Connected state and has received the "RRC Inactive Assistance Information" from the AMF as defined in TS 23.501 [2] clause 5.3.3.2.5

In the techniques of the related art, there occur the following problems.

The 5G-GUTI is not allocated in some cases hence jeopardizing user confidentiality The present application identifies some scenarios in which the UE's 5G-GUTI is not re-allocated (i.e. a new 5G-GUTI is not allocated) after the UE is paged and hence the security requirements that were stated previously will not be met. Certain scenarios are described below.

Scenario 1: the 5G-GUTI is not Allocated when Using User Plane CIoT 5GS Optimization The first scenario is related to the use of user plane CIoT 5GS optimization. As indicated earlier, the UE which is using user plane CIoT 5GS optimization does not always send a Service Request or Control Plane Service Request message after being paged. Hence, the existing requirement to allocate a new 5G-GUTI as quoted from [3]—"after a successful service request procedure invoked as a response to a paging request from the network and before the release of the N1 NAS signalling connection"—will not be met. Hence, this creates a case that the UE in 5GMM-IDLE with suspend indication gets paged, the 5G-GUTI does not get changed, and the UE may then go back to 5GMM-IDLE mode. While in 5GMM-IDLE mode, the UE can be paged again with the same 5G-S-TMSI (from the unchanged 5G-GUTI) and therefore the user's location and confidentiality can be jeopardized.

Figure 5:
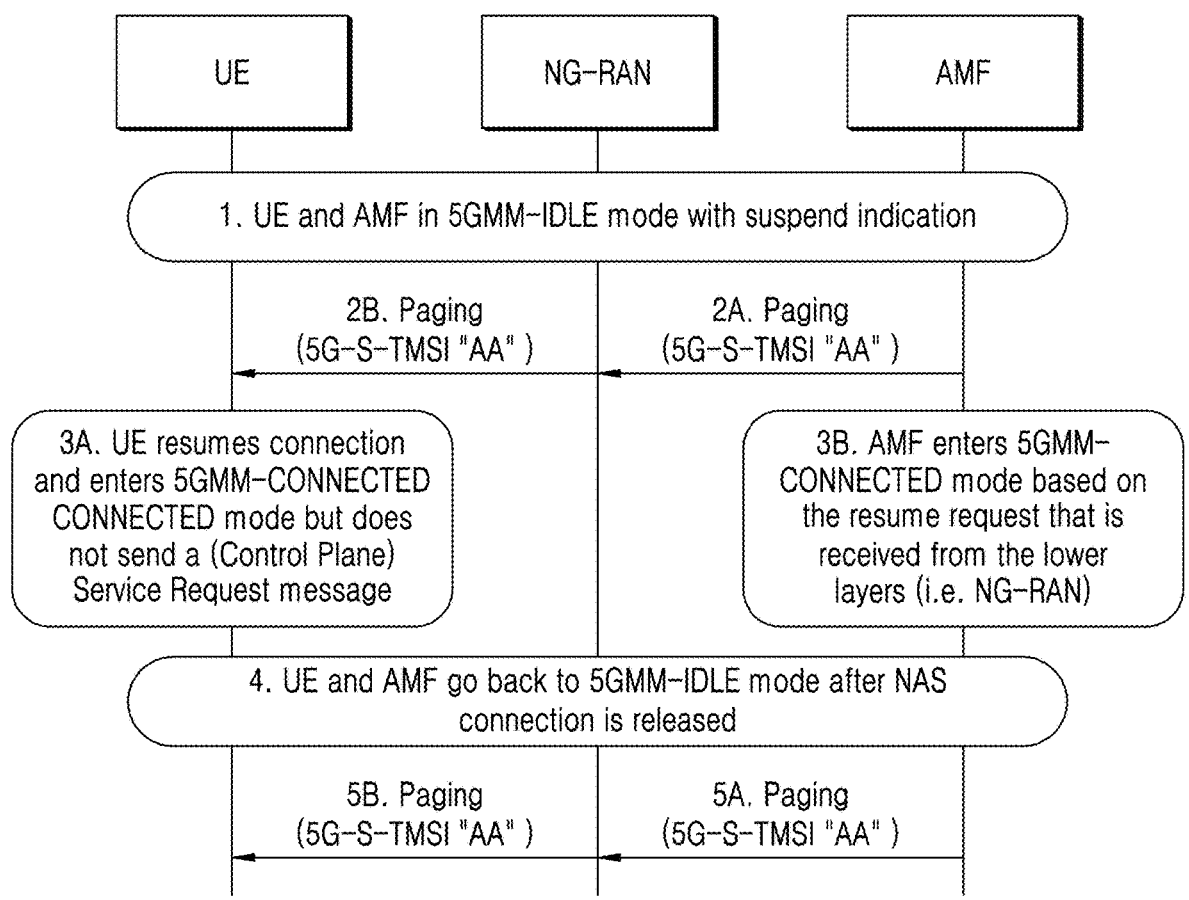
FIG. 5 illustrates the problem description for scenario 1.

The problem is illustrated in FIG. 5.

As can be seen, the service request procedure is not initiated after paging in step 2A/2B and hence the 5G-GUTI may not be re-allocated. If the UE goes back to 5GMM-IDLE mode (step 4), then paging the UE in step 5A/5B will be done with the same 5G-S-TMSI from the unchanged 5G-GUTI, hence the security requirement will not be met.

Note that as part of the resume procedure, the UE sends the RRCConnectionResumeRequest and sets the Resume-Cause to "mt-Access" as specified in [8]. By doing so, a rogue entity can determine that the UE is responding to paging and can therefore correlate the 5G-S-TMSI used in the paging with the UE that is responding to paging.

Scenario 2: the 5G-GUTI is not Allocated Due to the Use of RRC Inactive State

The UE can be paged and enter 5GMM-CONNECTED mode with a service request procedure. As part of the service request procedure, the AMF provides the necessary assistance information based on which the RAN can decide to put the UE in 5GMM-CONNECTED mode with RRC inactive indication. After the completion of the service request procedure, the RAN may put the UE in RRC inactive state for which the UE, at the NAS, will enter 5GMM-CONNECTED mode with RRC inactive indication. Although the NAS connection is not considered released, the AMF may still not have performed a 5G-GUTI re-allocation for the UE. If the UE now has an uplink NAS message or data to send, the UE will request the lower layer (i.e. RRC) to resume the connection. The resumption of the connection by the RRC may not succeed thereby leading to a fallback indication that is sent to the NAS. Once received at the NAS, the UE enters 5GMM-IDLE mode. This sequence of events creates a situation in which the UE was paged and the 5G-GUTI has not been re-allocated before the NAS connection is released i.e. the UE's NAS connection gets released before a new 5G-GUTI is allocated when the UE responded to the paging. Again, in this scenario, the requirement to allocate a new 5G-GUTI cannot be met.

Figure 6:
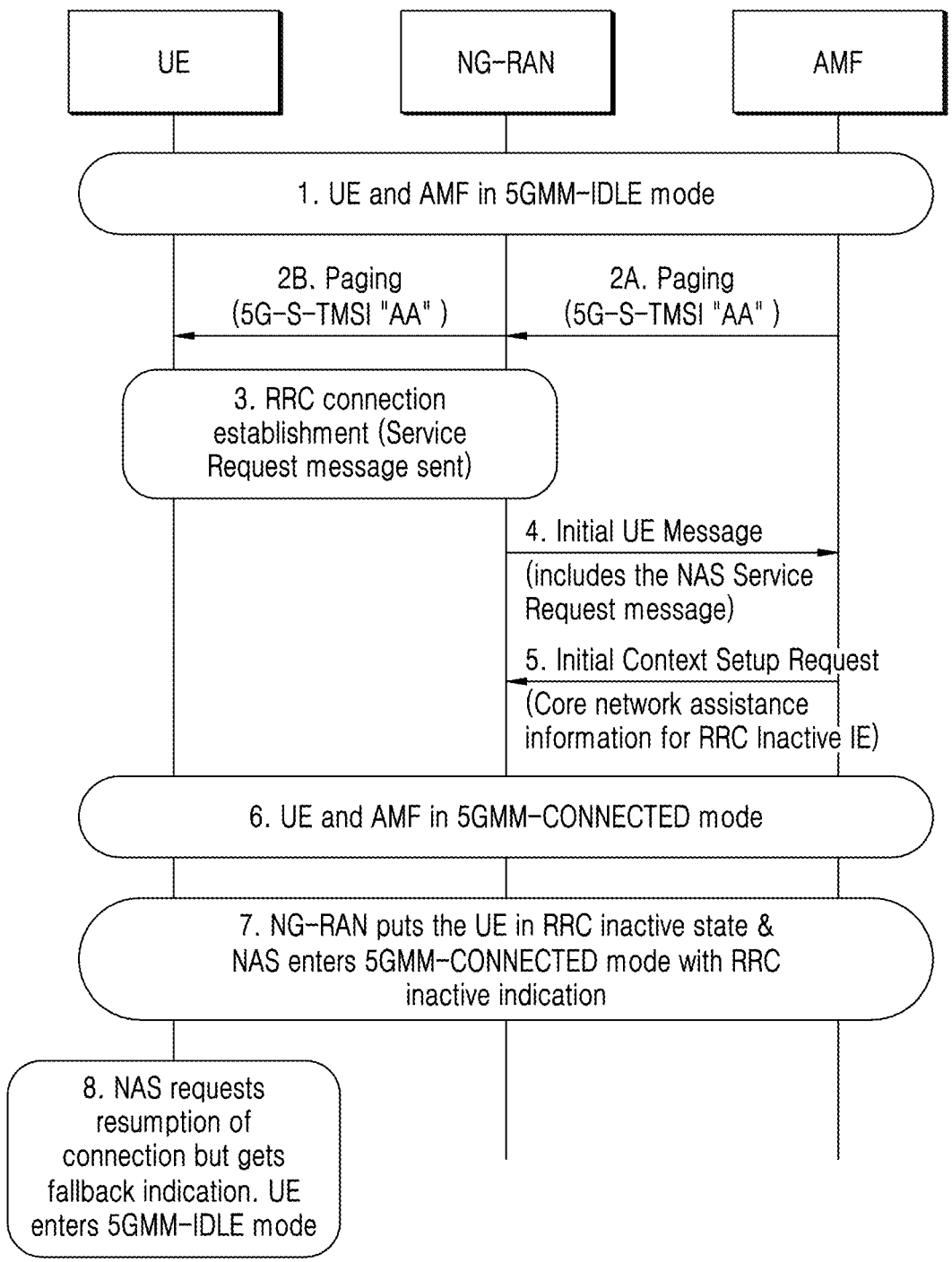
FIG. 6 illustrates the problem description for scenario 2.

The problem is illustrated in FIG. 6.

In step 8, the UE enters 5GMM-IDLE mode and the network did not allocated a new 5G-GUTI after a paging procedure. Thereby the security requirement for 5G-GUTI re-allocation cannot be met.

Figure 7:
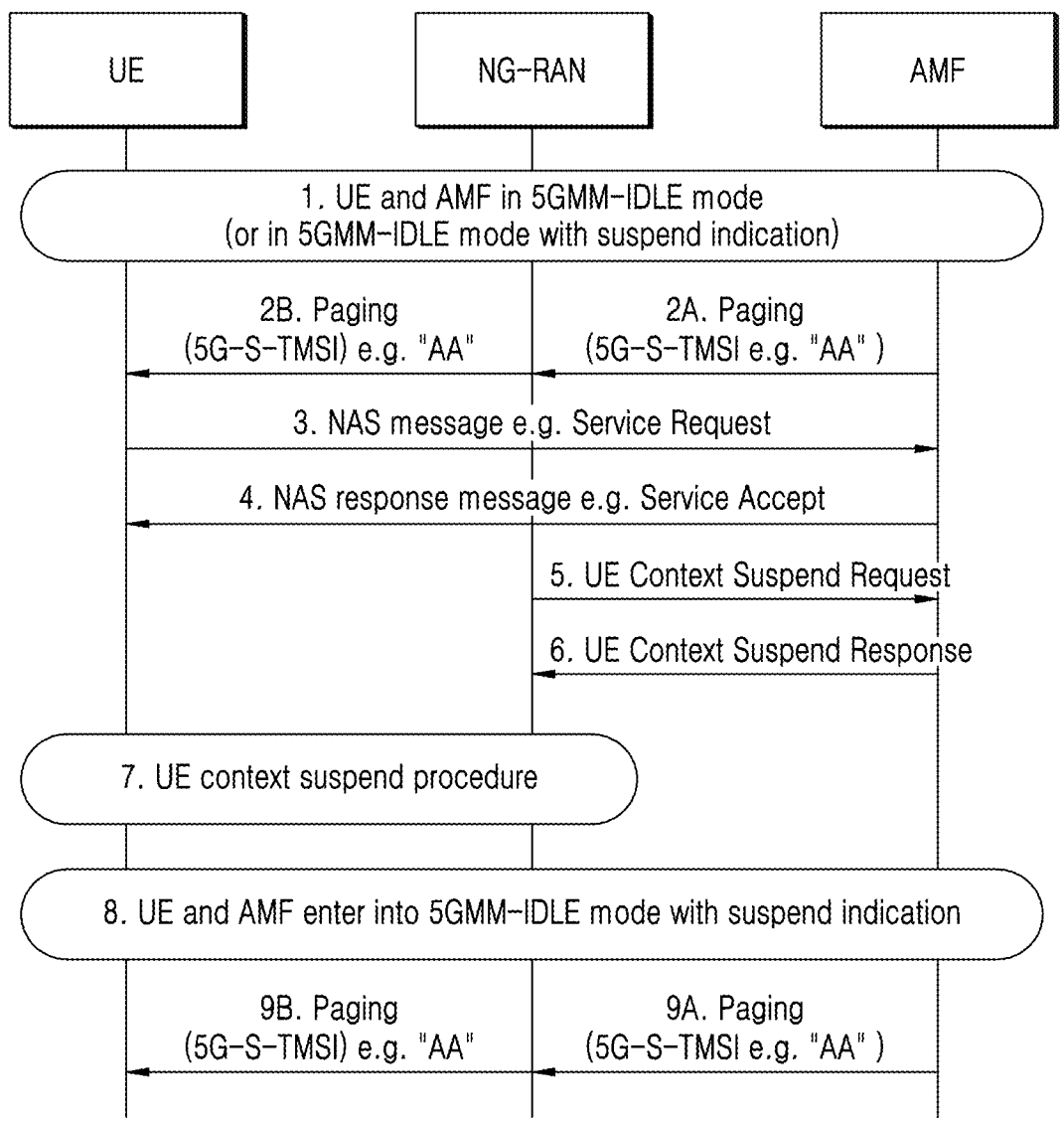
FIG. 7 illustrates the problem description for scenario 3.

Scenario 3: the 5G-GUTI is not Allocated after Paging that is Followed by a Service Request Procedure This scenario is illustrated in FIG. 7.

It starts with the UE and the AMF being in 5GMM-IDLE mode (step 1) and the network paging the UE (step 2A and 2B). The UE then sends a NAS message (step 3) in response to the paging, where this NAS message may be, for example, a Service Request message or a Control Plane Service Request message. After the service request procedure (i.e. at or after step 4), both the UE and the AMF enter 5GMM-CONNECTED mode. The RAN may then send a request to suspend the UE's context (step 5) due to the use of user plane 5G CIoT optimizations. If the AMF accepts and hence the UE's context is suspended at the RAN (step 6 and step 7), for which the UE and the AMF enter 5GMM-IDLE mode with suspend indication at the NAS (step 8), then the AMF will not have the opportunity to reallocate a new 5G GUTI for the UE.

Now if the AMF determines to page the UE again (step 9A and step 9B), then the AMF will use the same 5G GUTI (and hence the same 5G-S-TMSI, e.g. "AA") for paging the UE. This jeopardizes the UE's or user's privacy since the same temporary identifier is used for paging the UE twice. A rogue entity can then track the UE's position based on consecutive paging with the same temporary identity (e.g. 5G GUTI or 5G-S-TMSI) and the response from the UE at the RRC layer which then exposes the 5G GUTI or any other component of this identifier. Therefore, a solution is needed to avoid the scenario that has been identified above so that the UE's/user's privacy is not jeopardized and to avoid using the same temporary identity (5G GUTI or 5G-S-TMSI) for two or more consecutive paging.

Certain examples of the present disclosure address the above problems and provide improved user confidentiality. For example, certain examples of the present disclosure define conditions for allocating a new 5G-GUTI to a UE when:

a) the UE in 5GMM-IDLE mode with suspend indication is paged and the UE does not send a NAS message in response to paging. The AMF should allocate a new 5G-GUTI when it receives a request from the NG-RAN to resume the UE's connection.

b) the UE is paged and enters 5GMM-CONNECTED mode but before the UE transitions to 5GMM-CONNECTED mode with RRC inactive. The AMF should allocate a new 5G-GUTI to the UE before sending the core network assistance information to the NG-RAN.

In both of the cases above, the allocation of a new 5G-GUTI ensures that the security requirement for user confidentiality is not jeopardized.

Certain examples of the present disclosure provide a method, for an AMF entity in a network comprising a UE and the AMF entity, the method comprising: transmitting a paging message for the UE; and if a message of a certain type is not received in response to the paging message, allocating a new temporary identity for the UE when a request is received to resume a connection for the UE.

In certain examples, the paging message may be transmitted when the UE is in an idle mode (e.g. 5GMM-IDLE mode with suspend indication).

In certain examples, the paging message may comprise a 5G-S-TMSI.

In certain examples, the message of the certain type may be a NAS message.

In certain examples, the temporary identity may be a 5G-GUTI.

In certain examples, the request to resume a connection may be received from NG-RAN.

In certain examples, the method may further comprise entering, by the AMF, 5GMM-CONNECTED mode based on the request.

In certain examples, the method may further comprise transmitting the temporary identity to the UE.

In certain examples, the temporary identity may be transmitted in a Configuration Update Command.

Certain examples of the present disclosure provide a method, for a UE in a network comprising the UE and an AMF entity, the method comprising: receiving a paging message (e.g. when the UE is in 5GMM-IDLE mode with suspend indication); and if a message of a certain type (e.g. NAS message) is not transmitted in response to the paging message, receiving a new temporary identity for the UE (e.g. 5G-GUTI) when a connection for the UE is resumed.

Certain examples of the present disclosure provide a method, for an AMF entity in a network comprising a UE, a RAN entity, and the AMF entity, the method comprising: receiving a first message following a paging procedure; allocating a new temporary identity to the UE and transmitting the allocated temporary identity to the UE; and transmitting core network assistance information to the RAN entity, wherein the allocated temporary identity is transmitted to the UE before the core network assistance information is transmitted to the RAN entity.

In certain examples, the first message may be a Service Request message or a Control Plane Service Request message or Registration Request message.

In certain examples, the paging procedure may comprise transmitting a paging message (e.g. including a 5G-S-TMSI) while in an idle mode (e.g. 5GMM-IDLE mode).

In certain examples, the temporary identity may be transmitted in a Configuration Update Command message, and the core network assistance information may be transmitted in a UE Context Modification Request message.

In certain examples, the method may further comprise transmitting, to the RAN entity, an Initial Context Setup Request message excluding core network assistance information.

In certain examples, the temporary identity may be transmitted following a transition to 5GMM-CONNECTED mode.

In certain examples, the temporary identity may be transmitted in a Configuration Update Command message, and the core network assistance information may be transmitted in an Initial Context Setup Request message.

In certain examples, the Initial Context Setup Request message may comprise a response (e.g. Service Accept message) to the first message (e.g. Service Request message or Control Plane Service Request message or Registration Request message).

In certain examples, the temporary identity may be a 5G-GUTI.

Certain examples of the present disclosure provide a method, for a UE in a network comprising the UE, a RAN entity (e.g. NG-RAN entity), and an AMF entity, the method comprising: in response to a paging procedure (e.g. comprising receiving a paging message), transmitting a connection establishment request message (e.g. Service Request message); receiving, from the AMF entity, a new temporary identity (e.g. 5G-GUTI) allocated to the UE, wherein the temporary identity is received before core network assistance information is provided to the RAN entity.

Certain examples of the present disclosure provide a method, for an AMF entity in a network comprising a UE and the AMF entity, the method comprising: transmitting a first message for paging the UE, the first message comprising, or associated with, a first temporary identity allocated to the UE; receiving, from the UE, a second message (e.g. NAS message) in response to the first message; and optionally receiving a third message requesting to suspend a connection of the UE and/or to enter an idle mode (e.g. 5GMM-IDLE mode with suspend indication), wherein the method further comprises allocating a second temporary identity to the UE before the connection of the UE is suspended and/or before the AMF entity and/or the UE enters the idle mode.

In certain examples, the first message may be transmitted when the UE is in an idle mode (e.g. 5GMM-IDLE mode or 5GMM-IDLE mode with suspend indication).

In certain examples, the first temporary identity may comprise a 5G-S-TMSI, or may be associated with a 5G-GUTI.

In certain examples, the second message may comprise one or more of: a Service Request message; a Control Plane Service Request message; and a Registration Request message.

In certain examples, the third message may comprise a UE Context Suspend Request message.

In certain examples, the second temporary identity may be, or may be associated with, a 5G-GUTI.

In certain examples, the third message may be received from NG-RAN.

In certain examples, the method may further comprise entering, by the AMF, 5GMM-CONNECTED mode in response to the second message.

In certain example, the method may further comprise: if the second temporary identity has not been allocated to the UE when the third message (e.g. UE Context Suspend Request message) is received, transmitting a fourth message (e.g. UE Context Suspend Failure message) rejecting the request to suspend a connection of the UE; and allocating the second temporary identity to the UE after the fourth message is transmitted.

In certain examples, the UE may enter an idle mode (e.g. 5GMM-IDLE mode or 5GMM-IDLE mode with suspend indication) based on the request to suspend a connection of the UE.

In certain examples, allocating the second temporary identity to the UE may comprise transmitting the second temporary identity to the UE (e.g. in a Configuration Update Command message).

In certain examples, the second temporary identity may be transmitted to the UE after receiving the second message (e.g. NAS message).

In certain examples, the second temporary identity may be transmitted to the UE before the connection of the UE is suspended and/or before the AMF entity and/or the UE enters the idle mode (e.g. 5GMM-IDLE mode with suspend indication).

In certain examples, the method may further comprise transmitting a fifth message (e.g. NAS response message (e.g. Service Accept message or Registration Accept message)) in response to the second message (e.g. NAS message).

In certain examples, the second temporary identity may be transmitted to the UE before or after transmitting the fifth message (e.g. NAS response message).

Certain examples of the present disclosure provide a method, for a UE in a network comprising the UE and an AMF entity, the method comprising: receiving a first message for paging the UE, the first message comprising or associated with a first temporary identity allocated to the UE; transmitting, to the AMF entity, a second message (e.g. NAS message) in response to the first message; optionally receiving a third message requesting to suspend a connection of the UE and/or to enter an idle mode (e.g. 5GMM-IDLE mode with suspend indication), wherein the method further comprises allocation of a second temporary identity to the UE before the connection of the UE is suspended and/or before the AMF entity and/or the UE enters the idle mode.

In certain examples, the second temporary identity may be, or may be associated with, a 5G-GUTI.

Certain examples of the present disclosure provide an AMF configured to operate according to a method according to any of the examples disclosed herein.

Certain examples of the present disclosure provide a UE configured to operate according to a method according to any of the examples disclosed herein.

Certain examples of the present disclosure provide a network comprising an AMF entity, a RAN entity and/or a UE according to any of the examples disclosed herein.

Certain examples of the present disclosure provide a computer program comprising instructions which, when the program is executed by a computer or processor, cause the computer or processor to carry out a method according to any of the examples disclosed herein.

Certain examples of the present disclosure provide a computer or processor-readable data carrier having stored thereon a computer program according to any of the examples disclose herein.

Certain examples of the present disclosure may apply one or more of the following techniques.

Solution for Scenario 1: Allocating a New 5G-GUTI after a Connection has been Resumed To solve the problem identified in scenario 1, it is proposed that the after the AMF pages the UE that is in 5GMM-IDLE mode with suspend indication, the AMF should allocate a new 5G-GUTI when the UE's connection is resumed i.e. when the AMF receives a resume request from the lower layer (NG-RAN) then the AMF should allocate a new 5G-GUTI to the UE. The allocation of the new 5G-GUTI should occur before the NAS connection is released or before the NAS connection is suspended (i.e. before the UE and AMF enter 5GMM-IDLE mode with suspend indication again).

When the AMF, that has entered 5GMM-IDLE mode with suspend indication for a UE in question, receives a request from the NG-RAN to resume the UE's connection, the AMF should first enter 5GMM-CONNECTED mode and then send a Configuration Update Command message and allocated a new 5G-GUTI to the UE. This should occur before the NAS connection is released or before the connection is suspended again as stated above.

Figure 8:
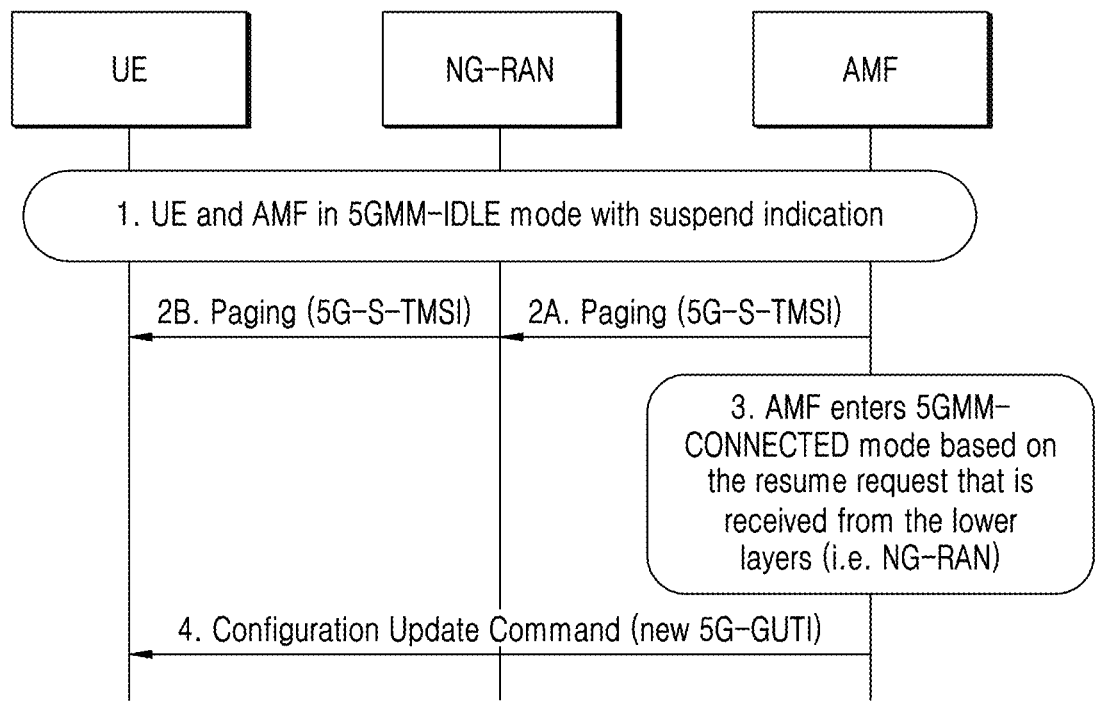
FIG. 8 illustrates a proposed solution for scenario 1.

This solution is illustrated in FIG. 8.

Solution for Scenario 2: Sending the Core Network Assistance Information to the NG-RAN after the 5G-GUTI Re-Allocation has been Completed When the AMF receives a Control Plane Service Request message or Service Request message or Registration Request message after a paging procedure, the AMF should not send the core network assistance information to the NG-RAN in the Initial Context Setup Request message (see [7]) if the AMF has not allocated a new 5G-GUTI to the UE. This ensures that the NG-RAN will not put the UE in RRC inactive state and therefore guarantees that a fallback cannot occur in the UE. After the AMF has allocated a new 5G-GUTI to the UE, the AMF should send the UE Context Modification Request message (see [7]) to the NG-RAN and provide the core network assistance information to the NG-RAN. The NG-RAN can then, based on the received information, decide to put the UE in RRC inactive state. At this time, the UE would have obtained a new 5G-GUTI and therefore even if a fallback occurs in the UE after which the UE enters 5GMM-IDLE mode, the UE would have already obtained a new 5G-GUTI and the security requirement would be met.

Alternatively, the AMF, before sending the Initial Context Setup Request message, which may carry the NAS Service Accept message (in response to the Service Request message that was sent by the UE), the AMF should first allocate a new 5G-GUTI using the Configuration Update Command message. After this, the AMF can then send the Initial Context Setup Request message to the NG-RAN and include the core network assistance information if any.

Figure 9:
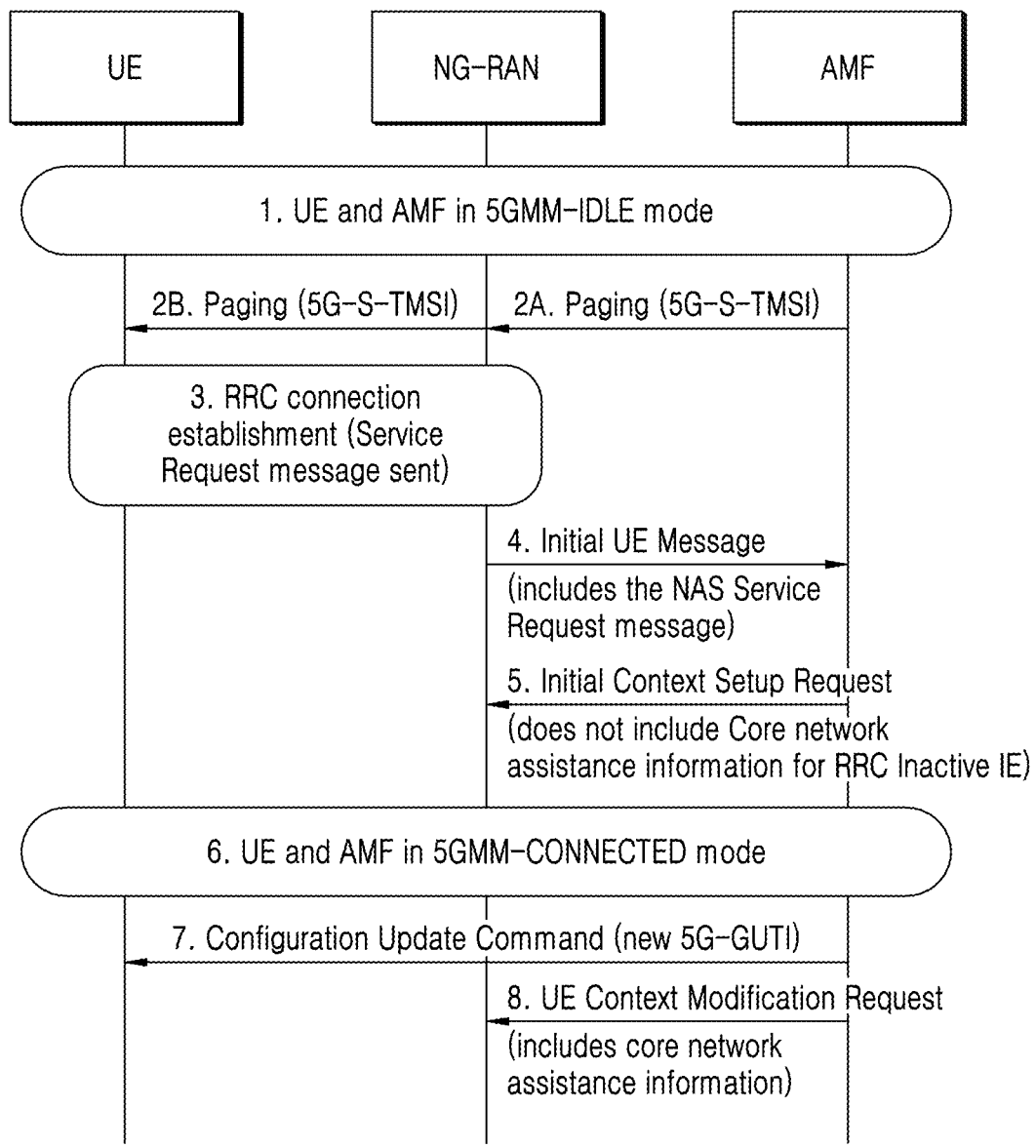
FIG. 9 illustrates a proposed solution for scenario 2.

This proposed solution (first alternative above) is illustrated in FIG. 9.

Solution for Scenario 3: Allocating a New 5G-GUTI after Paging and Service Request Procedure but Before the UE and/or AMF Enter the 5GMM-IDLE Mode with Suspend Indication To solve the problem identified in scenario 3, in certain examples of the present disclosure, when:

the network (e.g. AMF) pages the UE in 5GMM-IDLE mode or in 5GMM-IDLE mode with suspend indication, and the UE responds to the paging procedure with a NAS message, where the NAS message may be any of a Service Request message, Control Plane Service Request message, Registration Request message, or any other NAS message that may be permitted to be sent in response to a paging message, then the network (e.g. AMF) should (or shall) allocate a new 5G GUTI before the UE's connection (or RAN context) is suspended, i.e. before the UE and/or the AMF enter 5GMM-IDLE mode with suspend indication.

As such, when the network pages the UE, the UE sends a NAS message (e.g. any of the NAS messages listed above), the UE and the AMF enter 5GMM-CONNECTED mode, and if the RAN requests to suspend the UE's context or connection (e.g. AMF receives a UE Context Suspend Request message) before the AMF has allocated a new 5G GUTI, then the AMF may (or should) reject the request from the RAN to suspend the UE's context (e.g. the AMF may (or should) send the UE Context Suspend Failure message to the RAN). The AMF may include an indication (e.g. cause code) to describe the reason for rejecting the request from the RAN to suspend the UE's context. The AMF may (or should) then allocate a new 5G GUTI for the UE.

Figure 10:
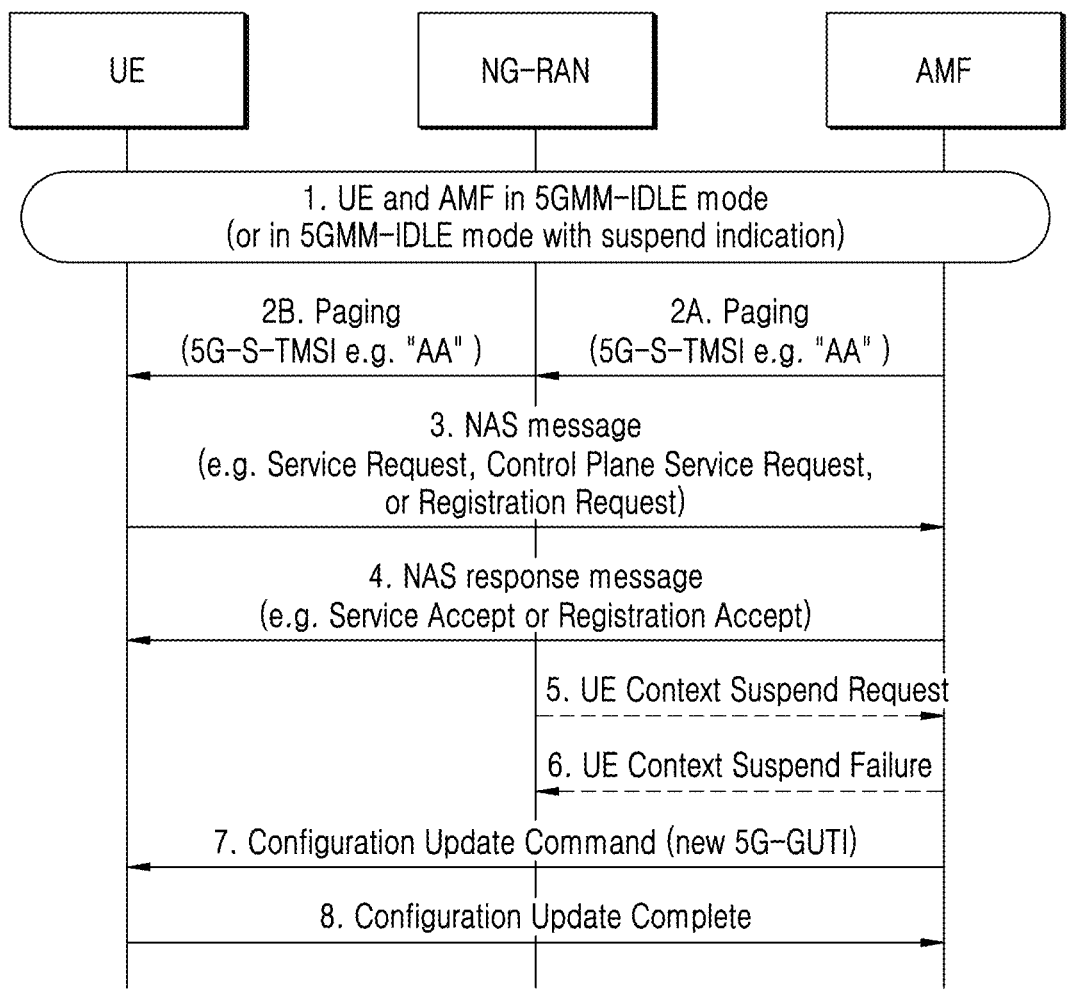
FIG. 10 illustrates a proposed solution for scenario 3.

This proposed solution is shown in FIG. 10.

According to this solution, certain examples of the present disclosure may ensure that the AMF allocates a new 5G GUTI before the UE and the AMF enter 5GMM-IDLE mode with suspend indication (i.e. before the UE's connection, or RAN context, is suspended). The AMF's allocation of a new 5G GUTI, for example by means of sending the Configuration Update Command message (i.e. step 7 in FIG. 10), may occur before sending a NAS response message, e.g. Service Accept or Registration Accept message (in step 4). Hence, the skilled person will appreciate that step 7 and step 8 may be performed earlier, e.g. after step 3 and optionally before step 4, in certain examples. The skilled person will appreciate that the specific embodiment illustrated in FIG. 10, for example including the specific order of sending the various messages, is only one example of this solution, and alternative embodiments and modifications are not restricted to this example. Hence, the order in which the illustrated operations are used may differ from what is shown in FIG. 10 in alternative embodiments.

A 5G-S-TMSI is a component of a 5G-GUTI, and one 5G-S-TMSI forms part of one 5G-GUTI, although the 5G-S-TMSI does not constitute the entire 5G-GUTI (see [1], section 2.10.1). A 5G-S-TMSI may be regarded as being associated with a corresponding 5G-GUTI. At the NAS, the UE is allocated a 5G-GUTI. However, for paging, the UE may be paged using a 5G-S-TMSI, which is a subset of the corresponding 5G-GUTI. For example, in steps 2A and 2B of FIG. 10, the paging messages includes a 5G-S-TMSI, which may be associated with a corresponding 5G-GUTI. In step 7 of FIG. 10 the new 5G-GUTI is different from the 5G-GUTI corresponding to the 5G-S-TMSI in steps 2A and 2B of FIG. 10.

In certain situations, the AMF may allocate a new 5G-GUTI before there is a request to suspend a connection of the UE and/or for the UE and/or AMF to enter an idle mode (e.g. 5GMM-IDLE mode with suspend indication). For example, the AMF may operate to allocate a new 5G-GUTI as soon as possible (e.g. after receiving a NAS message in response to paging (cf. step 3 of FIG. 10), or after transmitting a NAS response message (cf. step 4 of FIG. 10)). Therefore, when the AMF receives a UE Context Suspend Request (cf. step 5 of FIG. 10), a new 5G-GUTI may have already been allocated. In this case, the connection of the UE may be suspended and the UE and AMF may enter the idle mode. However, in the case that the AMF receives a UE Context Suspend Request (e.g. step 5 of FIG. 10) before a new 5G-GUTI has been allocated, then the AMF may allocate a new 5G-GUTI before the suspend. This may be achieved, for example, by rejecting the suspend (e.g. step 6 of FIG. 10) in order to send a NAS message for the allocation (e.g. step 7 of FIG. 10). The skilled person will appreciate that allocation of a new 5G-GUTI before the suspend may be achieved in other examples in any other suitable way, for example by delaying the suspend until a new 5G-GUTI is allocated.

Although also related to the previous problem and the new problem, in certain examples the AMF may always allocate a new 5G GUTI to the UE after paging the UE, and, in certain examples, optionally in response (to paging) to receiving, from the UE, a Registration Request message. The AMF's paging of the UE may happen for a UE that is in 5GMM-IDLE mode or that is 5GMM-IDLE mode with suspend indication. Moreover, if the AMF determines to allocate a new 5G GUTI to the UE that is in 5GMM-CONNECTED mode (i.e. after/following a response to paging) by means of sending a Configuration Update Command message with the new 5G GUTI, then the AMF may (or should) do so (i.e. allocate a new 5G GUTI to the UE) before the release of the UE's NAS connection, or before the UE and the AMF enter 5GMM IDLE with suspend indication.

The skilled person would appreciate that the techniques disclosed herein may also be apply to examples in which the paging of the UE is done by means of a NAS Notification message, or any other suitable technique. For example, the AMF may send a Notification message to the UE over the non-3GPP access when the UE is in 5GMM-CONNECTED mode over the non-3GPP access, and the UE may be in 5GMM-IDLE or 5GMM-IDLE with suspend indication on the 3GPP access. The Notification may have an access type indicating "3GPP access". In this case, when the UE responds to the Notification, either by sending a NAS message (as described above) or not, the AMF may take the same actions as in the various examples described herein.

Certain examples of the present disclosure ensure that the UE gets a new 5G-GUTI after being paged as per the security requirements in 5GS. Otherwise there will be some cases in which the UE will not get a new 5G-GUTI after being paged thereby giving rogue entities the opportunity to track the user and hence jeopardize user confidentiality.

Figure 11:
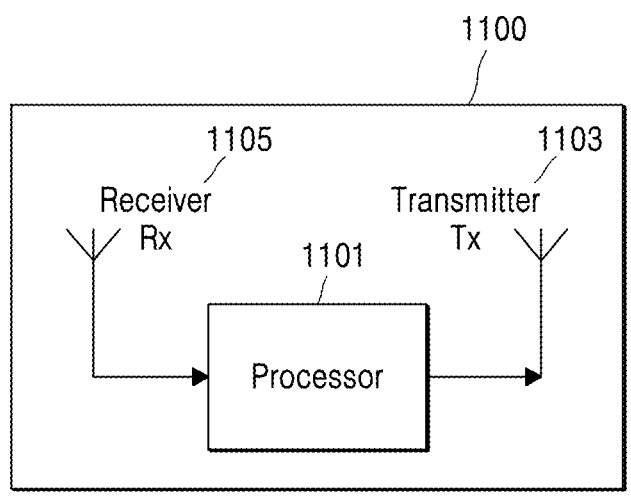
FIG. 11 is a block diagram of an exemplary network entity that may be used in certain examples of the present disclosure.

FIG. 11 is a block diagram of an exemplary network entity (e.g. AMF) or UE that may be used in examples of the present disclosure. The skilled person will appreciate that a network entity may be implemented, for example, as a network element on a dedicated hardware, as a software instance running on a dedicated hardware, and/or as a virtualised function instantiated on an appropriate platform, e.g. on a cloud infrastructure.

The entity or UE 1100 comprises a processor (or controller) 1101, a transmitter 1103 and a receiver 1105. The receiver 1105 is configured for receiving one or more messages from one or more other network entities, for example as described above. The transmitter 1103 is configured for transmitting one or more messages to one or more other network entities, for example as described above. The processor 1101 is configured for performing one or more operations, for example according to the operations as described above.

Figure 12:
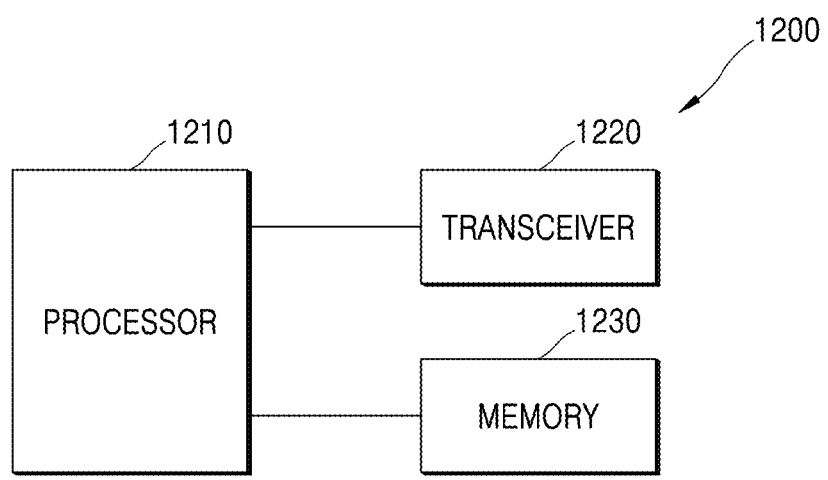
FIG. 12 is a diagram illustrating a UE 1200 according to an embodiment of the present disclosure.

FIG. 12 is a diagram illustrating a UE 1200 according to an embodiment of the present disclosure.

Referring to the FIG. 12, the UE 1200 may include a processor 1210, a transceiver 1220 and a memory 1230. However, all of the illustrated components are not essential. The UE 1200 may be implemented by more or less components than those illustrated in the FIG. 12. In addition, the processor 1210 and the transceiver 1220 and the memory 1230 may be implemented as a single chip according to another embodiment.

The aforementioned components will now be described in detail.

The processor 1210 may include one or more processors or other processing devices that control the proposed function, process, and/or method. Operation of the UE 1200 may be implemented by the processor 1210.

The transceiver 1220 may be connected to the processor 1210 and transmit and/or receive a signal. In addition, the transceiver 1220 may receive the signal through a wireless channel and output the signal to the processor 1210. The transceiver 1220 may transmit the signal output from the processor 1210 through the wireless channel.

The memory 1230 may store the control information or the data included in a signal obtained by the UE 1200. The memory 1230 may be connected to the processor 1210 and store at least one instruction or a protocol or a parameter for the proposed function, process, and/or method. The memory 1230 may include read-only memory (ROM) and/or random access memory (RAM) and/or hard disk and/or CD-ROM and/or DVD and/or other storage devices.

Figure 13:
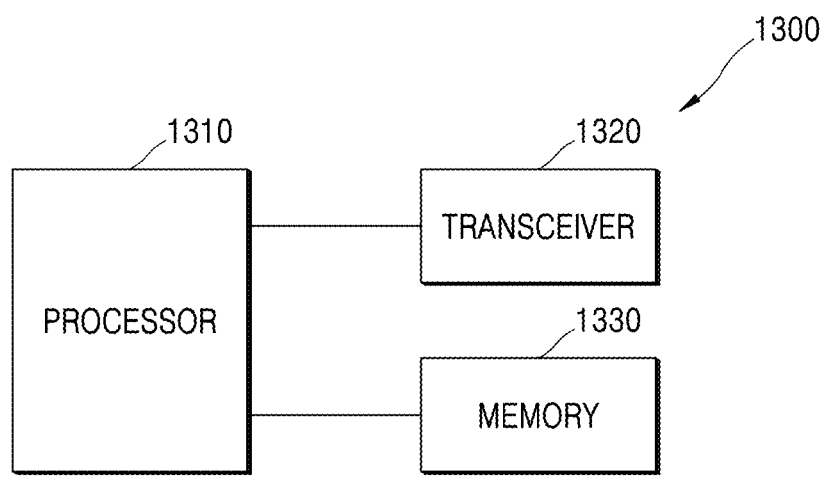
FIG. 13 is a diagram illustrating a base station 1300 according to an embodiment of the present disclosure.

FIG. 13 is a diagram illustrating a base station 1300 according to an embodiment of the present disclosure.

Referring to the FIG. 13, the base station 1300 may include a processor 1310, a transceiver 1320 and a memory 1330. However, all of the illustrated components are not essential. The base station 1300 may be implemented by more or less components than those illustrated in FIG. 13. In addition, the processor 1310 and the transceiver 1320 and the memory 1330 may be implemented as a single chip according to another embodiment.

The aforementioned components will now be described in detail.

The processor 1310 may include one or more processors or other processing devices that control the proposed function, process, and/or method. Operation of the base station 1300 may be implemented by the processor 1310.

The transceiver 1320 may be connected to the processor 1310 and transmit and/or receive a signal. The signal may include control information and data. In addition, the transceiver 1320 may receive the signal through a wireless channel and output the signal to the processor 1310. The transceiver 1320 may transmit a signal output from the processor 1310 through the wireless channel.

The memory 1330 may store the control information or the data included in a signal obtained by the base station 1300. The memory 1330 may be connected to the processor 1310 and store at least one instruction or a protocol or a parameter for the proposed function, process, and/or method. The memory 1330 may include read-only memory (ROM) and/or random access memory (RAM) and/or hard disk and/or CD-ROM and/or DVD and/or other storage devices.

Figure 14:
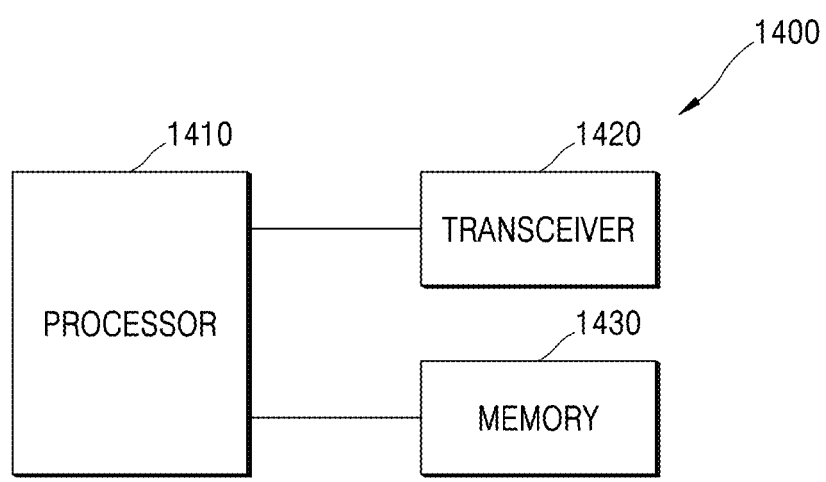
FIG. 14 schematically illustrates a core network entity according to embodiments of the present disclosure.

FIG. 14 schematically illustrates a core network entity according to embodiments of the present disclosure.

The network entity described above may correspond to the core network entity 1400.

Referring to the FIG. 14, the core network entity 1400 may include a processor 1410, a transceiver 1420 and a memory 1430. However, all of the illustrated components are not essential. The core network entity 1400 may be implemented by more or less components than those illustrated in FIG. 14. In addition, the processor 1410 and the transceiver 1420 and the memory 1430 may be implemented as a single chip according to another embodiment.

The aforementioned components will now be described in detail.

The transceiver 1420 may provide an interface for performing communication with other devices in a network. That is, the transceiver 1420 may convert a bitstream transmitted from the core network entity 1400 to other devices to a physical signal and covert a physical signal received from other devices to a bitstream. That is, the transceiver 1420 may transmit and receive a signal. The transceiver 1420 may be referred to as modem, transmitter, receiver, communication unit and communication module. The transceiver 1420 may enable the core network entity 1400 to communicate with other devices or system through backhaul connection or other connection method.

The memory 1430 may store a basic program, an application program, configuration information for an operation of the core network entity 1000. The memory 1430 may include volatile memory, non-volatile memory and a combination of the volatile memory and the non-volatile memory. The memory 1030 may provide data according to a request from the processor 1410.

The processor 1410 may control overall operations of the core network entity 1400. For example, the processor 1410 may transmit and receive a signal through the transceiver 1420. The processor 1410 may include at least one processor. The processor 1410 may control the core network entity 1400 to perform operations according to embodiments of the present disclosure.

In accordance with an embodiment of the disclosure, a method, for a first network entity (e.g. an AMF entity), in a network comprising a UE and the first entity is provided. The method may comprise: transmitting a paging message for the UE; and allocating a new temporary identity for the UE when a request is received to resume a connection for the UE.

In an embodiment, wherein the paging message is transmitted when the UE is in an idle mode (e.g. 5GMM-IDLE mode with suspend indication).

In an embodiment, wherein the request is in response to transmitting the paging message.

In an embodiment, wherein the request to resume a connection is received from lower layers (e.g. NG-RAN).

In an embodiment, wherein the temporary identity is a 5G-GUTI.

In an embodiment, wherein the new temporary identity is allocated before the UE's NAS connection is suspended e.g. before the UE and/or the AMF enters an idle mode (e.g. 5GMM-IDLE mode with suspend indication).

In an embodiment, wherein the UE re-enters the idle mode due to user plane CIoT 5GS optimization.

In an embodiment, the method may further comprise entering a non-idle mode (e.g. 5GMM-CONNECTED mode) based on the request.

In an embodiment, the method may further comprise transmitting the temporary identity to the UE.

In an embodiment, wherein the temporary identity is transmitted in a Configuration Update Command message.

In an embodiment, wherein the paging message comprises a 5G-S-TMSI.

In an embodiment, wherein the new temporary identity is allocated if a message of a certain type is not received in response to the paging message.

In an embodiment, the message of the certain type is a NAS message.

In accordance with an embodiment of the disclosure, a method, for a first network entity (e.g. an AMF entity), in a network comprising a UE and the first entity is provided. The method may comprise: transmitting a first message for paging the UE; receiving a second message requesting a network procedure (e.g. service request procedure) in response to the paging; and allocating a new temporary identity to the UE before the connection of the UE is suspended and/or before the first network entity and/or the UE enters an idle mode (e.g. 5GMM-IDLE mode with suspend indication).

In an embodiment, wherein the new temporary identity is allocated after successfully performing the network procedure.

In an embodiment, wherein the new temporary identity comprises a 5G-GUTI.

In an embodiment, wherein the second message comprises one or more of: a Service Request message; a Control Plane Service Request message; and a Registration Request message.

In an embodiment, wherein the connection of the UE is suspended and/or the first network entity and/or the UE enters an idle mode due to user plane CIoT 5GS optimization (i.e. enters 5GMM-IDLE mode with suspend indication).

In an embodiment, wherein the first message comprises, or is associated with, a first temporary identity allocated to the UE, and wherein allocating the new temporary identity comprises allocating a second temporary identity to the UE.

In an embodiment, wherein the first message is transmitted when the UE is in an idle mode (e.g. 5GMM-IDLE mode or 5GMM-IDLE mode with suspend indication).

In an embodiment, wherein the method comprises receiving a third message (e.g. UE Context Suspend Request message) requesting to suspend the connection of the UE and/or to enter the idle mode.

In an embodiment, wherein the third message comprises a UE Context Suspend Request message.

In an embodiment, wherein the third message is received from lower layers (e.g. NG-RAN).

In an embodiment, the method may further comprise entering a non-idle mode (e.g. 5GMM-CONNECTED mode) in response to the second message.

In an embodiment, the method may further comprise if the new temporary identity has not been allocated to the UE when a request to suspend the connection of the UE and/or to enter the idle mode is received, rejecting the request.

In an embodiment, wherein rejecting the request to suspend the connection of the UE and/or to enter the idle mode comprises transmitting a fourth message (e.g. UE Context Suspend Failure message).

In an embodiment, the method comprises allocating the new temporary identity to the UE after the fourth message is transmitted.

In an embodiment, wherein allocating the new temporary identity to the UE comprises transmitting the new temporary identity to the UE (e.g. in a Configuration Update Command message).

In an embodiment, wherein the new temporary identity is transmitted to the UE after receiving the second message (e.g. NAS message).

In an embodiment, wherein the new temporary identity is transmitted to the UE before the connection of the UE is suspended and/or before the first network entity and/or the UE enters the idle mode (e.g. 5GMM-IDLE mode with suspend indication).

In an embodiment, wherein the method comprises transmitting a fifth message (e.g. NAS response message (e.g. Service Accept message or Registration Accept message)) in response to the second message (e.g. NAS message).

In an embodiment, wherein the new temporary identity is transmitted to the UE before or after transmitting the fifth message (e.g. NAS response message).

In an embodiment, a network entity (e.g. an AMF entity or a user equipment) may be configured to operate according to the above method.

In an embodiment, a network entity (e.g. a user equipment or an AMF entity) may be configured to cooperate with the network entity.

In an embodiment, a network (or wireless communication system) may comprise one or more network entities.

In an embodiment, a computer program may comprise instructions which, when the program is executed by a computer or processor, cause the computer or processor to carry out the above method.

In an embodiment, a computer or processor-readable data carrier having stored thereon the computer program may be provided.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain example provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

While the invention has been shown and described with reference to certain examples, it will be understood by those skilled in the art that various changes in form and detail may be made therein without departing from the scope of the invention, as defined by the appended claims.

ACRONYMS, ABBREVIATIONS AND DEFINITIONS

In the present disclosure, the following acronyms, abbreviations and definitions are used.

3GPP 3rd Generation Partnership Project
4G $4^{th}$ Generation
5G $5^{th}$ Generation
5GC 5G Core
5GMM 5G Mobility Management
5GS 5G System
5GSM 5G Session Management
AMF Access and Mobility Management Function
AN Access Network
AS Access Stratum
CIoT Cellular IoT
CM Connection Management
CN Core Network
DL DownLink/Downlink
DRB Dedicated Radio Bearer
EDT Early Data Transmission
eNB Base Station
EPS Evolved Packet System
E-UTRA Evolved Universal Terrestrial Radio Access
GUTI Globally Unique Temporary UE Identity
(H-)SMF Home-SMF
ID Identity
IE Information Element
IoT Internet of Things
MAC Medium Access Control
MME Mobility Management Entity
MO Mobile Originated
N1 Interface between UE and AMF
N2 Interface between AMF via (R)AN
N4 Interface between SMF and UPF
NAS Non Access Stratum
NB Narrowband
NEF Network Exposure Function
NG-RAN 5G RAN
PDU Protocol Data Unit
RAN Radio Access Network
RAT Radio Access Technology
RCU Radio Capability Update
Rel Release
RRC Radio Resource Control
S1-AP S1 Application Protocol
S1 mode a mode of a UE that operates with a functional division that is in accordance with the use of an S1 interface between the radio access network and the core network
S1-U S1-User Plane
S-GW Serving Gateway
SM Session Management
SMF Session Management Function
SRB Signaling Radio Bearer S-TMSI Short TMSI
TMSI Temporary Mobile Subscriber Identity
TS Technical Specification
UE User Equipment
UL UpLink/Uplink
UP User Plane
UPF User Plane Function
WB Wideband

The invention claimed is:

1. A method performed by an access and mobility function (AMF) entity in a wireless communication system, the method comprising:
receiving an indication that a radio resource control (RRC) connection is resumed for a user equipment (UE) in a 5G mobility management (5GMM)-idle mode with a suspend indication, the RRC connection being resumed as a response to a paging request;
assigning a 5G-globally unique temporary UE identity (GUTI) to the UE after receiving the indication and before a suspension of a N1 non-access-stratum (NAS) signaling connection; and
transmitting, to the UE, a configuration update command message including the 5G-GUTI.

2. The method of claim 1, wherein
the UE uses a user plane cellular internet of things (CIoT) $5^{th}$ generation system (5GS) optimization.

3. The method of claim 1, wherein the suspension of the N1 NAS signaling connection occurs due to a user plane cellular internet of things (CIoT) $5^{th}$ generation system (5GS) optimization.

4. The method of claim 1, wherein
the indication is from a lower layer.

5. An access and mobility management function (AMF) entity in a wireless communication system, the AMF entity comprising:
a transceiver; and
at least one processor coupled with the transceiver and configured to:
receive an indication that a radio resource control (RRC) connection is resumed for a user equipment (UE) in a 5G mobility management (5GMM)-idle mode with a suspend indication, the RRC connection being resumed as a response to a paging request,
assign a 5G-globally unique temporary UE identity (GUTI) to the UE after receiving the indication and before a suspension of a N1 non-access-stratum (NAS) signaling connection, and
transmit, to the UE, a configuration update command message including the 5G-GUTI.

6. The AMF entity of claim 5, wherein
the UE uses a user plane cellular internet of things (CIoT) $5^{th}$ generation system (5GS) optimization.

7. The AMF entity of claim 5, wherein the suspension of the N1 NAS signaling connection occurs due to a user plane cellular internet of things (CIoT) $5^{th}$ generation system (5GS) optimization.

8. The AMF entity of claim 5, wherein
the indication is from a lower layer.

9. A method performed by a user equipment (UE) in a wireless communication system, the method comprising:
receiving a paging request in a 5G mobility management (5GMM)-idle mode with a suspend indication, the paging request being associated with a resumption of a radio resource control (RRC) connection; and
receiving, from an access and mobility function (AMF) entity, a configuration update command message including a 5G-globally unique temporary UE identity (GUTI),
wherein the 5G-GUTI is associated with an indication that the RRC connection is resumed for the UE and a suspension of a N1 non-access-stratum (NAS) signaling connection.

10. The method of claim 9, wherein the UE uses a user plane cellular internet of things (CIoT) $5^{th}$ generation system (5GS) optimization.

11. The method of claim 9, wherein the suspension of the N1 NAS signaling connection occurs due to a user plane cellular internet of things (CIoT) $5^{th}$ generation system (5GS) optimization.

12. The method of claim 9, wherein the indication is associated with a lower layer.

13. A user equipment (UE) in a wireless communication system, the UE comprising:
a transceiver; and
at least one processor coupled with the transceiver and configured to:
receive a paging request in a 5G mobility management (5GMM)-idle mode with a suspend indication, the paging request being associated with a resumption of a radio resource control (RRC) connection, and
receive, from an access and mobility function (AMF) entity, a configuration update command message including a 5G-globally unique temporary UE identity (GUTI),
wherein the 5G-GUTI is associated with an indication that the RRC connection is resumed for the UE and a suspension of a N1 non-access-stratum (NAS) signaling connection.

* * * * *